United States Patent
Lv et al.

(10) Patent No.: US 9,813,112 B2
(45) Date of Patent: Nov. 7, 2017

(54) POWER CONTROL METHOD, DEVICE, AND SYSTEM

(71) Applicant: Huawei Technologies Co., Ltd., Shenzhen, Guangdong (CN)

(72) Inventors: Jie Lv, Wuhan (CN); Xiang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 14/928,567

(22) Filed: Oct. 30, 2015

(65) Prior Publication Data

US 2016/0049990 A1 Feb. 18, 2016

Related U.S. Application Data

(63) Continuation of application No. PCT/CN2013/075148, filed on May 3, 2013.

(51) Int. Cl.
*H04B 3/487* (2015.01)
*H04L 5/00* (2006.01)
*H04B 3/32* (2006.01)
*H04L 27/26* (2006.01)

(52) U.S. Cl.
CPC .......... *H04B 3/487* (2015.01); *H04B 3/32* (2013.01); *H04L 5/0042* (2013.01); *H04L 5/0085* (2013.01); *H04L 27/2601* (2013.01)

(58) Field of Classification Search
CPC ......... H04B 3/32; H04B 3/487; H04L 5/0042; H04L 5/0085; H04L 27/2601
See application file for complete search history.

(56) References Cited

U.S. PATENT DOCUMENTS

| | | | |
|---|---|---|---|
| 2007/0280334 A1 | 12/2007 | Lv et al. | |
| 2012/0027060 A1* | 2/2012 | Singh | H04B 3/487 375/222 |
| 2015/0155914 A1* | 6/2015 | Wahibi | H04B 3/32 370/201 |

FOREIGN PATENT DOCUMENTS

| | | |
|---|---|---|
| CN | 101047459 A | 10/2007 |
| CN | 101083553 A | 12/2007 |
| CN | 101222242 A | 7/2008 |

(Continued)

OTHER PUBLICATIONS

George Ginis, et al., "Vectored Transmission for Digital Subscriber Line Systems", IEEE Journal on Selected Areas in Communications, vol. 20, No. 5, Jun. 2002, p. 1085-1104.

*Primary Examiner* — Jae Y Lee

(57) ABSTRACT

Embodiments of the present invention provide a power control method, device, and system, and relate to the field of communications technologies. The method is applied to a vectoring system, where the vectoring system includes multiple lines, each line includes multiple subcarriers, and for each subcarrier, a crosstalk channel is formed between the multiple lines, and the method includes: obtaining a closed subcarrier set of the multiple lines according to line crosstalk channel information corresponding to each subcarrier of the multiple subcarriers, where the closed subcarrier set includes a subcarrier set required to be closed on the multiple lines; and sending the closed subcarrier set of the multiple lines to a transceiver, and closing, by the transceiver, a transmit signal on a subcarrier required to be closed on each line.

13 Claims, 7 Drawing Sheets

(56) References Cited

FOREIGN PATENT DOCUMENTS

| CN | 102388588 A | 3/2012 |
|---|---|---|
| EP | 1 962 437 A1 | 8/2008 |

\* cited by examiner

POWER CONTROL METHOD, DEVICE, AND SYSTEM

CROSS-REFERENCE TO RELATED APPLICATIONS

This application is a continuation of International Application No. PCT/CN2013/075148, filed on May 3, 2013, which is hereby incorporated by reference in its entirety.

TECHNICAL FIELD

The present invention relates to the field of communications technologies, and in particular, to a power control method, device, and system.

BACKGROUND

With fast development of communications technologies, xDSL (digital subscriber line) as a high-speed data transmission technology is widely applied. However, G.fast (gigabit DSL) as a latest xDSL technology uses a high frequency band during data transmission, and therefore a crosstalk phenomenon is very severe. To eliminate an effect of crosstalk on data transmission, a vectoring technology emerges as the times require.

In a vectoring system shown in FIG. 1, when downlink transmission is performed, each transceiver of a sending party serves as a sending end, each transceiver of a receiving party serves as a receive end, and before undergoing IFFT (Inverse Fast Fourier Transform) transformation, a transmit signal of each transceiver of the sending party needs to be precoded by a canceller (Precoder). After being precoded and undergoing the IFFT transformation, the transmit signal may be sent. A downlink canceller used for crosstalk cancellation is located before a module that sends data, and therefore the downlink canceller is also referred to as a downlink precoder, and a downlink cancellation matrix is also referred to as a downlink precoding matrix. Therefore, a meaning of the downlink canceller is the same as that of the downlink precoder, and a meaning of the downlink cancellation matrix is the same as that of the downlink precoding matrix. During data transmission, to prevent transmission of the transmit signal from generating excessively large interference to another signal, power of the transmit signal is generally controlled.

In the prior art, two power control manners are generally included. In a first control manner, after performing inversion according to a channel matrix to obtain a cancellation matrix, a VCE (vectoring control entity) obtains a diagonal matrix according to the cancellation matrix, and sends the obtained diagonal matrix to a transceiver; and the transceiver calculates, according to the value of a corresponding diagonal element of the diagonal matrix, a power control factor that is less than or equal to the corresponding diagonal element of the diagonal matrix, and then multiplies the power control factor by a transmit signal before cancellation, to obtain a transmit signal whose power is scaled, thereby implementing control of power of the transmit signal. In a second control manner, after performing inversion according to a channel matrix to obtain a cancellation matrix, a VCE obtains a diagonal matrix according to the cancellation matrix, uses a matrix obtained after the cancellation matrix is multiplied by the diagonal matrix as a new cancellation matrix, and sends the new cancellation matrix to a canceller; and the canceller encodes a transmit signal according to the new cancellation matrix, thereby implementing control of power of the transmit signal.

During implementation of the present invention, the inventor finds that the prior art at least has the following problem:

No matter whether the first control manner or the second control manner is used, inversion needs to be performed according to a channel matrix to calculate a cancellation matrix, each element value of a cancellation matrix obtained after inversion is performed on a channel matrix whose condition number is bad is excessively large, and each element value of a diagonal matrix is excessively small, and therefore an extent to which power of a transmit signal is scaled is excessively large, which alleviates strength of the narrowed transmit signal, so that a sending rate is greatly affected, which severely reduces power use efficiency.

SUMMARY

To solve a problem existing in the prior art, embodiments of the present invention provide a power control method, device, and system. The technical solutions are as follows:

According to a first aspect, a power control method is provided, and applied to a vectoring system, where the vectoring system includes multiple lines, each line includes multiple subcarriers, and for each subcarrier, a crosstalk channel is formed between the multiple lines, where the method includes:

obtaining a closed subcarrier set of the multiple lines according to line crosstalk channel information corresponding to each subcarrier of the multiple subcarriers, where the closed subcarrier set includes a subcarrier set required to be closed on the multiple lines; and sending the closed subcarrier set of the multiple lines to a transceiver, and closing, by the transceiver, a transmit signal on a subcarrier required to be closed on each line, so as to perform power control.

With reference to the first aspect, in a first possible implementation manner of the first aspect, the obtaining a closed subcarrier set of the multiple lines includes:

calculating, according to the line crosstalk channel information corresponding to each subcarrier, a line set required to be closed and corresponding to each subcarrier; and searching, according to the calculated line set corresponding to each subcarrier, for a subcarrier required to be closed on each line in the line set, to obtain the subcarrier set, required to be closed, of the multiple lines.

With reference to the first possible implementation manner of the first aspect, in a second possible implementation manner of the first aspect, the calculating, according to the line crosstalk channel information corresponding to each subcarrier, a line set required to be closed and corresponding to each subcarrier includes:

estimating a power gain factor according to the line crosstalk channel information corresponding to each subcarrier, and adding a line that makes the estimated power gain factor greater than a threshold to the line set required to be closed and corresponding to each subcarrier.

With reference to the second possible implementation manner of the first aspect, in a third possible implementation manner of the first aspect, the line crosstalk channel information corresponding to each subcarrier includes a channel matrix corresponding to each subcarrier, and the estimating a power gain factor according to the line crosstalk channel information corresponding to each subcarrier, and adding a line that makes the estimated power gain factor greater than a threshold to the line set required to be closed and corresponding to each subcarrier includes:

step a1: calculating, according to a channel matrix corresponding to any subcarrier, a cancellation matrix $P^k$ of the any subcarrier, and using each element in $P^k$ as an estimated power gain factor;

step b1: determining whether each element in $P^k$ of the any subcarrier is greater than a first preset threshold; and step c1: if an element $P^k_{ij}$ in $P^k$ of the any subcarrier is greater than the first preset threshold, adding a line with a lower priority of a line i and a line j to a line set required to be closed and corresponding to the any subcarrier, where $P^k_{ij}$ denotes a cancellation coefficient of crosstalk of the line j to the line i.

With reference to the third possible implementation manner of the first aspect, in a fourth possible implementation manner of the first aspect, after the adding a line with a lower priority of a line i and a line j to a line set required to be closed and corresponding to the any subcarrier, the method further includes:

if the line i is added to the line set required to be closed and corresponding to the any subcarrier, removing the ith row and the ith column of the channel matrix corresponding to the any subcarrier, and repetitively performing step a1 to step c1 on remaining submatrices, until all elements in $P^k$ of the any subcarrier are less than the first preset threshold; or if the line j is added to the line set required to be closed and corresponding to the any subcarrier, removing the jth row and the jth column of the channel matrix corresponding to the any subcarrier, and repetitively performing step a1 to step c1 on remaining submatrices, until all elements in $P^k$ of the any subcarrier are less than the first preset threshold.

With reference to the second possible implementation manner of the first aspect, in a fifth possible implementation manner of the first aspect, the line crosstalk channel information corresponding to each subcarrier includes a channel matrix corresponding to each subcarrier, and the estimating a power gain factor according to the line crosstalk channel information corresponding to each subcarrier, and adding a line that makes the estimated power gain factor greater than a threshold to the line set required to be closed and corresponding to each subcarrier includes:

step a2: selecting an index submatrix corresponding to a channel matrix corresponding to any subcarrier, and calculating a power gain factor PI (i, j) of the index submatrix;

step b2: determining whether the power gain factor PI (i, j) of the index submatrix is greater than a second preset threshold; and step c2: if the power gain factor PI (i, j) of the index submatrix is greater than the second preset threshold, adding a line with a lower priority of a line i and a line j to a line set required to be closed and corresponding to the any subcarrier.

With reference to the fifth possible implementation manner of the first aspect, in a sixth possible implementation manner of the first aspect, after the adding a line with a lower priority of a line i and a line j to a line set required to be closed and corresponding to the any subcarrier, the method further includes:

if the line i is added to the line set required to be closed and corresponding to the any subcarrier, removing the ith row and the ith column of the channel matrix corresponding to the any subcarrier, selecting another index submatrix corresponding to the channel matrix corresponding to the any subcarrier, and sequentially performing step a2 to step c2 on the index submatrix, until all lines are traversed; or if the line j is added to the line set required to be closed and corresponding to the any subcarrier, removing the jth row and the jth column of the channel matrix corresponding to the any subcarrier, selecting another index submatrix corresponding to the channel matrix corresponding to the any subcarrier, and sequentially performing step a2 to step c2 on the index submatrix, until all lines are traversed.

With reference to the second possible implementation manner of the first aspect, in a seventh possible implementation manner of the first aspect, the line crosstalk channel information corresponding to each subcarrier includes a channel matrix corresponding to each subcarrier, and the estimating a power gain factor according to the line crosstalk channel information corresponding to each subcarrier, and adding a line that makes the estimated power gain factor greater than a threshold to the line set required to be closed and corresponding to each subcarrier includes:

step a3: decomposing a channel matrix corresponding to any subcarrier to obtain a unitary matrix and a triangular matrix, and calculating a value of a minimum element of a modulus value of a diagonal of the triangular matrix, and/or calculating a ratio of the value of the minimum element of the modulus value of the diagonal of the triangular matrix to a length of a vector formed by the kth column in a channel matrix corresponding to the element, where a reciprocal of the value of the minimum element of the modulus value of the diagonal of the triangular matrix, and/or a reciprocal of the ratio of the value of the minimum element of the modulus value of the diagonal of the triangular matrix to the length of the vector formed by the kth column in the channel matrix corresponding to the element is a power gain factor;

step b3: determining whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and step c3: if the value of the minimum element of the modulus value is less than the third preset threshold, and/or the ratio of the value of the minimum element of the modulus value to the length of the vector formed by the kth column in the channel matrix corresponding to the element is less than the fourth preset threshold, adding a line j corresponding to the minimum element to a line set required to be closed and corresponding to the any subcarrier.

With reference to the seventh possible implementation manner of the first aspect, in an eighth possible implementation manner of the first aspect, after the adding a line j corresponding to the minimum element to a line set required to be closed and corresponding to the any subcarrier, the method further includes:

removing the jth row and the jth column of the channel matrix corresponding to the any subcarrier, and repetitively performing step a3 to step c3 on remaining submatrices, until the value of the minimum element of the modulus value is less than the third preset threshold, and/or the ratio of the value of the minimum element of the modulus value to the length of the vector formed by the kth column in the channel matrix corresponding to the element is less than the fourth preset threshold.

With reference to the first aspect, in a ninth possible implementation manner of the first aspect, after the sending the closed subcarrier set of the multiple lines to a transceiver, the method further includes: calculating, by the transceiver, a corresponding diagonal matrix according to a cancellation matrix of each subcarrier, and performing power control on the transmit signal according to the obtained diagonal matrix.

With reference to the first aspect and the first to ninth possible implementation manners of the first aspect, in a tenth possible implementation manner of the first aspect, the method further includes:

allocating power on the subcarrier required to be closed on each line to an unclosed subcarrier on each line.

With reference to the first aspect and the first to ninth possible implementation manners of the first aspect, in an eleventh possible implementation manner, the closing, by the transceiver, a transmit signal on a subcarrier required to be closed on each line includes:

closing, by the transceiver, a data symbol transmit signal of the subcarrier required to be closed on each line, and opening a synchronization symbol transmit signal.

With reference to the first aspect and the first to ninth and eleventh possible implementation manners of the first aspect, in a twelfth possible implementation manner of the first aspect, the method further includes:

determining whether a trigger condition for updating a closed subcarrier set of each line is satisfied;

if the trigger condition for updating the closed subcarrier set of each line is satisfied, updating the closed subcarrier set of each line to obtain a new closed subcarrier set of each line; and obtaining, according to the closed subcarrier set of each line and the new closed subcarrier set of each line, a subcarrier, required to be re-enabled, of each line, and enabling the subcarrier, required to be re-enabled, of each line.

With reference to the twelfth possible implementation manner of the first aspect, in a thirteenth possible implementation manner of the first aspect, the determining whether a trigger condition for updating a closed subcarrier set of each line is satisfied includes:

when a new line is added, determining that the trigger condition for updating the closed subcarrier set of each line is satisfied; or when an original line leaves, determining that the trigger condition for updating the closed subcarrier set of each line is satisfied; or when a power status of an original line changes, determining that the trigger condition for updating the closed subcarrier set of each line is satisfied; or when a channel matrix is updated, determining that the trigger condition for updating the closed subcarrier set of each line is satisfied.

With reference to the twelfth possible implementation manner of the first aspect, in a fourteenth possible implementation manner of the first aspect, before the updating the closed subcarrier set of each line to obtain a new closed subcarrier set of each line, the method further includes:

sending a non-zero signal on a synchronization symbol of a closed subcarrier in the closed subcarrier set of each line, where the non-zero signal includes at least a pilot signal; and re-calculating the channel matrix corresponding to each subcarrier according to each pilot signal, where the updating the closed subcarrier set of each line to obtain a new closed subcarrier set of each line includes:

updating the closed subcarrier set of each line according to the channel matrix corresponding to each subcarrier, to obtain the new closed subcarrier set of each line.

According to a second aspect, a power control device is provided, and applied to a vectoring system, where the vectoring system includes multiple lines, each line includes multiple subcarriers, and for each subcarrier, a crosstalk channel is formed between the multiple lines, where the device includes:

a first obtaining module, configured to obtain a closed subcarrier set of the multiple lines according to line crosstalk channel information corresponding to each subcarrier of the multiple subcarriers, where the closed subcarrier set includes a subcarrier set required to be closed on the multiple lines; and a first sending module, configured to send the closed subcarrier set of the multiple lines obtained by the obtaining module to a transceiver, where the transceiver closes a transmit signal on a subcarrier required to be closed on each line, so as to perform power control.

With reference to the second aspect, in a first possible implementation manner of the second aspect, the first obtaining module includes:

a calculation unit, configured to calculate, according to the line crosstalk channel information corresponding to each subcarrier, a line set required to be closed and corresponding to each subcarrier; and a searching unit, configured to search, according to the line set that is corresponding to each subcarrier and that is calculated by the calculation unit, for a subcarrier required to be closed on each line in the line set, to obtain the subcarrier set, required to be closed, of the multiple lines.

With reference to the first possible implementation manner of the second aspect, in a second possible implementation manner of the second aspect, the calculation unit is configured to estimate a power gain factor according to the line crosstalk channel information corresponding to each subcarrier, and add a line that makes the estimated power gain factor greater than a threshold to the line set required to be closed and corresponding to each subcarrier.

With reference to the second possible implementation manner of the second aspect, in a third possible implementation manner of the second aspect, the line crosstalk channel information corresponding to each subcarrier includes a channel matrix corresponding to each subcarrier, and the calculation unit is configured to: calculate, according to a channel matrix corresponding to any subcarrier, a cancellation matrix $P^k$ of the any subcarrier, and use each element in $P^k$ as an estimated power gain factor; determine whether each element in $P^k$ of the any subcarrier is greater than a first preset threshold; and if an element $P^k_{ij}$ in $P^k$ of the any subcarrier is greater than the first preset threshold, add a line with a lower priority of a line i and a line j to a line set required to be closed and corresponding to the any subcarrier, where $P^k_{ij}$ denotes a cancellation coefficient of crosstalk of the line j to the line i.

With reference to the third possible implementation manner of the second aspect, in a fourth possible implementation manner of the second aspect, the line crosstalk channel information corresponding to each subcarrier includes the channel matrix corresponding to each subcarrier, and the calculation unit is further configured to: if the line i is added to the line set required to be closed and corresponding to the any subcarrier, remove the ith row and the ith column of the channel matrix corresponding to the any subcarrier, and repetitively perform the following steps on remaining submatrices: determining whether each element in $P^k$ of the any subcarrier is greater than a first preset threshold; and if an element $P^k_{ij}$ in $P^k$ of the any subcarrier is greater than the first preset threshold, adding a line with a lower priority of a line i and a line j to a line set required to be closed and corresponding to the any subcarrier, until all elements in $P^k$ of the any subcarrier are less than the first preset threshold; or the calculation unit is further configured to: if the line j is added to the line set required to be closed and corresponding to the any subcarrier, remove the jth row and the jth column of the channel matrix corresponding to the any subcarrier, and repetitively perform the following steps on remaining submatrices: determining whether each element in $P^k$ of the any subcarrier is greater than a first preset threshold; and if an element $P^k_{ij}$ in $P^k$ of the any subcarrier is greater than the first preset threshold, adding a line with a lower priority of a line i and a line j to a line set required to be closed and corresponding to the any subcarrier, until all elements in $P^k$ of the any subcarrier are less than the first preset threshold.

With reference to the second possible implementation manner of the second aspect, in a fifth possible implementation manner of the second aspect, the line crosstalk channel information corresponding to each subcarrier includes a channel matrix corresponding to each subcarrier, and the calculation unit is configured to: select an index submatrix corresponding to a channel matrix corresponding to any subcarrier, and calculate a power gain factor PI (i, j) of the index submatrix; determine whether the power gain factor PI (i, j) of the index submatrix is greater than a second preset threshold; and if the power gain factor PI (i, j) of the index submatrix is greater than the second preset threshold, add a line with a lower priority of a line i and a line j to a line set required to be closed and corresponding to the any subcarrier.

With reference to the fifth possible implementation manner of the second aspect, in a sixth possible implementation manner of the second aspect, the calculation unit is further configured to: if the line i is added to the line set required to be closed and corresponding to the any subcarrier, remove the ith row and the ith column of the channel matrix corresponding to the any subcarrier, select another index submatrix corresponding to the channel matrix corresponding to the any subcarrier, and perform the following steps: selecting an index submatrix corresponding to a channel matrix corresponding to any subcarrier and calculating a power gain factor PI (i, j) of the index submatrix; determining whether the power gain factor PI (i, j) of the index submatrix is greater than a second preset threshold; and if the power gain factor PI (i, j) of the index submatrix is greater than the second preset threshold, adding a line with a lower priority of a line i and a line j to a line set required to be closed and corresponding to the any subcarrier, until all lines are traversed; or the calculation unit is further configured to: if the line j is added to the line set required to be closed and corresponding to the any subcarrier, remove the jth row and the jth column of the channel matrix corresponding to the any subcarrier, select another index submatrix corresponding to the channel matrix corresponding to the any subcarrier, and perform the following steps: selecting an index submatrix corresponding to a channel matrix corresponding to any subcarrier and calculating a power gain factor PI (i, j) of the index submatrix; determining whether the power gain factor PI (i, j) of the index submatrix is greater than a second preset threshold; and if the power gain factor PI (i, j) of the index submatrix is greater than the second preset threshold, adding a line with a lower priority of a line i and a line j to a line set required to be closed and corresponding to the any subcarrier, until all lines are traversed.

With reference to the second possible implementation manner of the second aspect, in a seventh possible implementation manner of the second aspect, the line crosstalk channel information corresponding to each subcarrier includes a channel matrix corresponding to each subcarrier, and the calculation unit is configured to: decompose a channel matrix corresponding to any subcarrier to obtain a unitary matrix and a triangular matrix, and calculate a value of a minimum element of a modulus value of a diagonal of the triangular matrix, and/or calculate a ratio of the value of the minimum element of the modulus value of the diagonal of the triangular matrix to a length of a vector formed by the kth column in a channel matrix corresponding to the element, where a reciprocal of the value of the minimum element of the modulus value of the diagonal of the triangular matrix, and/or a reciprocal of the ratio of the value of the minimum element of the modulus value of the diagonal of the triangular matrix to the length of the vector formed by the kth column in the channel matrix corresponding to the element is a power gain factor; determine whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and if the value of the minimum element of the modulus value is less than the third preset threshold, and/or the ratio of the value of the minimum element of the modulus value to the length of the vector formed by the kth column in the channel matrix corresponding to the element is less than the fourth preset threshold, add a line j corresponding to the minimum element to a line set required to be closed and corresponding to the any subcarrier.

With reference to the seventh possible implementation manner of the second aspect, in an eighth possible implementation manner of the second aspect, the calculation unit is further configured to remove the jth row and the jth column of the channel matrix corresponding to the any subcarrier, and repetitively perform the following steps on remaining submatrices: decomposing a channel matrix corresponding to any subcarrier to obtain a unitary matrix and a triangular matrix, and calculating a value of a minimum element of a modulus value of a diagonal of the triangular matrix, and/or calculating a ratio of the value of the minimum element of the modulus value of the diagonal of the triangular matrix to a length of a vector formed by the kth column in a channel matrix corresponding to the element; determining whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and if the value of the minimum element of the modulus value is less than the third preset threshold, and/or the ratio of the value of the minimum element of the modulus value to the length of the vector formed by the kth column in the channel matrix corresponding to the element is less than the fourth preset threshold, adding a line j corresponding to the minimum element to a line set required to be closed and corresponding to the any subcarrier, until the value of the minimum element of the modulus value is less than the third preset threshold, and/or the ratio of the value of the minimum element of the modulus value to the length of the vector formed by the kth column in the channel matrix corresponding to the element is less than the fourth preset threshold.

With reference to the second aspect and the first to eighth possible implementation manners of the second aspect, in a ninth possible implementation manner of the second aspect, the device further includes:

an allocation module, configured to allocate power on the subcarrier required to be closed on each line to an unclosed subcarrier on each line.

With reference to the second aspect and the first to ninth possible implementation manners of the second aspect, in a tenth possible implementation manner of the second aspect, the device further includes:

a determining module, configured to determine whether a trigger condition for updating a closed subcarrier set of each line is satisfied;

an updating module, configured to: when the determining module determines that the trigger condition for updating the closed subcarrier set of each line is satisfied, updating the closed subcarrier set of each line to obtain a new closed subcarrier set of each line; and an enabling module, configured to obtain, according to the closed subcarrier set of each line obtained by the first obtaining module and the new closed subcarrier set of each line obtained by the updating module, a subcarrier, required to be re-enabled, of each line, and enabling the subcarrier, required to be re-enabled, of each line.

With reference to the tenth possible implementation manner of the second aspect, in an eleventh possible implementation manner of the second aspect, the determining module is configured to: when a new line is added, determine that the trigger condition for updating the closed subcarrier set of each line is satisfied; or when an original line leaves, determine that the trigger condition for updating the closed subcarrier set of each line is satisfied; or when a power status of an original line changes, determine that the trigger condition for updating the closed subcarrier set of each line is satisfied; or when a channel matrix is updated, determine that the trigger condition for updating the closed subcarrier set of each line is satisfied.

With reference to the tenth possible implementation manner of the second aspect, in a twelfth possible implementation manner of the second aspect, the device further includes:

a second sending module, configured to send a non-zero signal on a synchronization symbol of a closed subcarrier in the closed subcarrier set of each line, where the non-zero signal includes at least a pilot signal; and a second calculation module, configured to re-calculate the channel matrix corresponding to each subcarrier according to each pilot signal, where the updating module is configured to update the closed subcarrier set of each line according to the channel matrix that is corresponding to each subcarrier and that is calculated by the second calculation module, to obtain the new closed subcarrier set of each line.

According to a third aspect, a power control system is further provided, where the system includes: a power control device and a transceiver, where the power control device is the power control device according to the foregoing description, and the transceiver is configured to receive a closed subcarrier set of multiple lines sent by the power control device, and close a transmit signal on a subcarrier required to be closed on each line, so as to perform power control.

Beneficial effects of the technical solutions provided in the embodiments of the present invention are as follows:

In the present invention, a closed subcarrier set of each line is calculated by using line crosstalk channel information corresponding to each subcarrier, and the closed subcarrier set is sent to a transceiver, so that the transceiver closes a transmit signal on a subcarrier required to be closed on each line, so as to ensure performance of remaining lines, and bring a more desirable effect when power control is performed.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Embodiment 1

Figure 2:
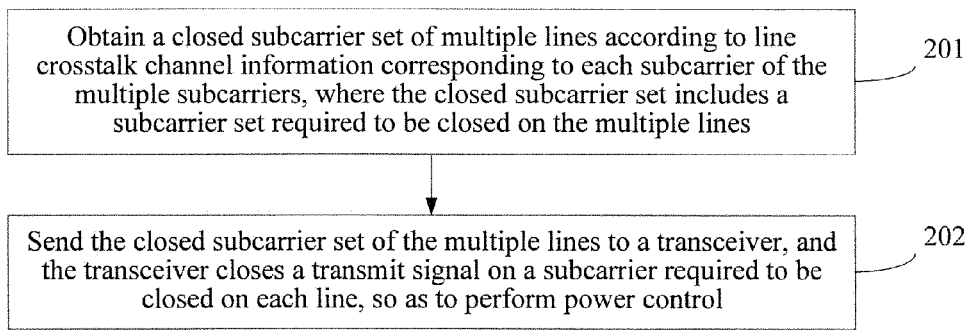
FIG. 2 is a flowchart of a power control method according to Embodiment 1 of the present invention.

This embodiment of the present invention provides a power control method, the method is applied to a vectoring system, where the vectoring system includes multiple lines, each line includes multiple subcarriers, and for each subcarrier, a crosstalk channel is formed between the multiple lines. Referring to FIG. 2, a process of the method provided in this embodiment includes the following steps:

201: Obtain a closed subcarrier set of the multiple lines according to line crosstalk channel information corresponding to each subcarrier of the multiple subcarriers, where the closed subcarrier set includes a subcarrier set required to be closed on the multiple lines.

The obtaining a closed subcarrier set of the multiple lines includes:

calculating, according to the line crosstalk channel information corresponding to each subcarrier, a line set required to be closed and corresponding to each subcarrier; and searching, according to the calculated line set corresponding to each subcarrier, for a subcarrier required to be closed on each line in the line set, to obtain the subcarrier set, required to be closed, of the multiple lines.

Further, the calculating, according to the line crosstalk channel information corresponding to each subcarrier, a line set required to be closed and corresponding to each subcarrier includes:

estimating a power gain factor according to the line crosstalk channel information corresponding to each subcarrier, and adding a line that makes the estimated power gain factor greater than a threshold to the line set required to be closed and corresponding to each subcarrier.

Further, the line crosstalk channel information corresponding to each subcarrier includes a channel matrix corresponding to each subcarrier, and the estimating a power gain factor according to the line crosstalk channel information corresponding to each subcarrier, and adding a line that makes the estimated power gain factor greater than a threshold to the line set required to be closed and corresponding to each subcarrier includes:

step a1: calculating, according to a channel matrix corresponding to any subcarrier, a cancellation matrix $P^k$ of the any subcarrier, and using each element in $P^k$ as an estimated power gain factor;

step b1: determining whether each element in $P^k$ of the any subcarrier is greater than a first preset threshold; and step c1: if an element $P^k_{ij}$ in $P^k$ of the any subcarrier is greater than the first preset threshold, adding a line with a lower priority of a line i and a line j to a line set required to be closed and corresponding to the any subcarrier, where $P^k_{ij}$ denotes a cancellation coefficient of crosstalk of the line j to the line i.

Further, after the adding a line with a lower priority of a line i and a line j to a line set required to be closed and corresponding to the any subcarrier, the method further includes:

if the line i is added to the line set required to be closed and corresponding to the any subcarrier, removing the ith row and the ith column of the channel matrix corresponding to the any subcarrier, and repetitively performing step a1 to step c1 on remaining submatrices, until all elements in $P^k$ of the any subcarrier are less than the first preset threshold; or if the line j is added to the line set required to be closed and corresponding to the any subcarrier, removing the jth row and the jth column of the channel matrix corresponding to the any subcarrier, and repetitively performing step a1 to step c1 on remaining submatrices, until all elements in $P^k$ of the any subcarrier are less than the first preset threshold.

Optionally, the line crosstalk channel information corresponding to each subcarrier includes a channel matrix corresponding to each subcarrier, and the estimating a power gain factor according to the line crosstalk channel information corresponding to each subcarrier, and adding a line that makes the estimated power gain factor greater than a threshold to the line set required to be closed and corresponding to each subcarrier includes:

step a2: selecting an index submatrix corresponding to a channel matrix corresponding to any subcarrier, and calculating a power gain factor PI (i, j) of the index submatrix;

step b2: determining whether the power gain factor PI (i, j) of the index submatrix is greater than a second preset threshold; and step c2: if the power gain factor PI (i, j) of the index submatrix is greater than the second preset threshold, adding a line with a lower priority of a line i and a line j to a line set required to be closed and corresponding to the any subcarrier.

Further, after the adding a line with a lower priority of a line i and line j to a line set required to be closed and corresponding to the any subcarrier, the method further includes:

if the line i is added to the line set required to be closed and corresponding to the any subcarrier, removing the ith row and the ith column of the channel matrix corresponding to the any subcarrier, selecting another index submatrix corresponding to the channel matrix corresponding to the any subcarrier, and sequentially performing step a2 to step c2 on the index submatrix, until all lines are traversed; or if the line j is added to the line set required to be closed and corresponding to the any subcarrier, removing the jth row and the jth column of the channel matrix corresponding to the any subcarrier, selecting another index submatrix corresponding to the channel matrix corresponding to the any subcarrier, and sequentially performing step a2 to step c2 on the index submatrix, until all lines are traversed.

Optionally, the line crosstalk channel information corresponding to each subcarrier includes a channel matrix corresponding to each subcarrier, and the estimating a power gain factor according to the line crosstalk channel information corresponding to each subcarrier, and adding a line that makes the estimated power gain factor greater than a threshold to the line set required to be closed and corresponding to each subcarrier includes:

step a3: decomposing a channel matrix corresponding to any subcarrier to obtain a unitary matrix and a triangular matrix, and calculating a value of a minimum element of a modulus value of a diagonal of the triangular matrix, and/or calculating a ratio of the value of the minimum element of the modulus value of the diagonal of the triangular matrix to a length of a vector formed by the kth column in a channel matrix corresponding to the element, where a reciprocal of the value of the minimum element of the modulus value of the diagonal of the triangular matrix, and/or a reciprocal of the ratio of the value of the minimum element of the modulus value of the diagonal of the triangular matrix to the length of the vector formed by the kth column in the channel matrix corresponding to the element is a power gain factor;

step b3: determining whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and step c3: if the value of the minimum element of the modulus value is less than the third preset threshold, and/or the ratio of the value of the minimum element of the modulus value to the length of the vector formed by the kth column in the channel matrix corresponding to the element is less than the fourth preset threshold, adding a line j corresponding to the minimum element to a line set required to be closed and corresponding to the any subcarrier.

Further, after the adding a line j corresponding to the minimum element to a line set required to be closed and corresponding to the any subcarrier, the method further includes:

removing the jth row and the jth column of the channel matrix corresponding to the any subcarrier, and repetitively performing step a3 to step c3 on remaining submatrices, until the value of the minimum element of the modulus value is less than the third preset threshold, and/or the ratio of the value of the minimum element of the modulus value to the length of the vector formed by the kth column in the channel matrix corresponding to the element is less than the fourth preset threshold.

202: Send the closed subcarrier set of the multiple lines to a transceiver, and the transceiver closes a transmit signal on a subcarrier required to be closed on each line, so as to perform power control.

Further, after the sending the closed subcarrier set of the multiple lines to a transceiver, the method further includes: calculating, by the transceiver, a corresponding diagonal matrix according to a cancellation matrix of each subcarrier, and performing power control on the transmit signal according to the obtained diagonal matrix.

Further, the method further includes:
allocating power on the subcarrier required to be closed on each line to an unclosed subcarrier on each line.

Further, the closing, by the transceiver, a transmit signal on a subcarrier required to be closed on each line includes:
closing, by the transceiver, a data symbol transmit signal of the subcarrier required to be closed on each line, and opening a synchronization symbol transmit signal.

Further, the method further includes:
determining whether a trigger condition for updating a closed subcarrier set of each line is satisfied;
if the trigger condition for updating the closed subcarrier set of each line is satisfied, updating the closed subcarrier set of each line to obtain a new closed subcarrier set of each line; and
obtaining, according to the closed subcarrier set of each line and the new closed subcarrier set of each line, a subcarrier, required to be re-enabled, of each line, and enabling the subcarrier, required to be re-enabled, of each line.

The transceiver may be a local or remote transceiver.

The determining whether a trigger condition for updating a closed subcarrier set of each line is satisfied includes:
when a new line is added, determining that the trigger condition for updating the closed subcarrier set of each line is satisfied; or
when an original line leaves, determining that the trigger condition for updating the closed subcarrier set of each line is satisfied; or
when a power status of an original line changes, determining that the trigger condition for updating the closed subcarrier set of each line is satisfied; or
when a channel matrix is updated, determining that the trigger condition for updating the closed subcarrier set of each line is satisfied.

Further, before the updating the closed subcarrier set of each line to obtain a new closed subcarrier set of each line, the method further includes:
sending a non-zero signal on a synchronization symbol of a closed subcarrier in the closed subcarrier set of each line, where the non-zero signal includes at least a pilot signal; and
re-calculating the channel matrix corresponding to each subcarrier according to each pilot signal, where
the updating the closed subcarrier set of each line to obtain a new closed subcarrier set of each line includes:
updating the closed subcarrier set of each line according to the channel matrix corresponding to each subcarrier, to obtain the new closed subcarrier set of each line.

According to the method provided in this embodiment, a closed subcarrier set of each line is calculated by using channel information corresponding to each subcarrier, and the closed subcarrier set is sent to a transceiver, so that the transceiver closes a transmit signal on a subcarrier required to be closed on each line, so as to ensure performance of remaining lines, and bring a more desirable effect when power control is performed. In addition, after the transmit signal on the subcarrier required to be closed on each line is closed, to keep system performance, when a trigger condition for updating the closed subcarrier set of each line is satisfied, the transmit signal on the subcarrier in the closed subcarrier set of each line may be further re-restored, and therefore, a power control manner is more flexible, and the system performance is more optimized.

Embodiment 2

Figure 1:
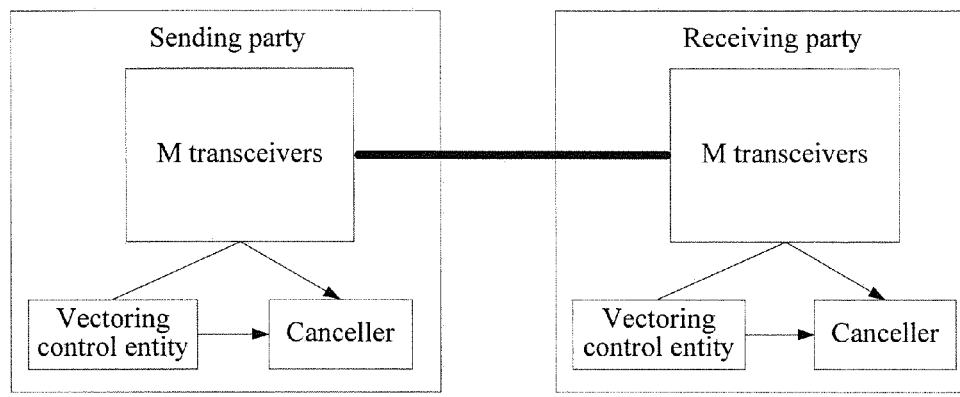
FIG. 1 shows a vectoring system according to an embodiment of the present invention.

The present invention provides a power control method. An example in which M (M>0) transceivers exist in both a sending party and a receiving party in the vectoring system shown in FIG. 1 and are corresponding to K (K>0) subcarriers is used, and on the kth (k=1 to K) subcarrier, a downlink signal transmission process may be described into the following form:

$$x'^k = P^k \cdot x^k \quad (1)$$

$$y^k = Feq^k \cdot (H^k \cdot P^k \cdot x^k \gamma_k) \quad (2)$$

where $P^k$ identifies a cancellation matrix of the kth subcarrier and has a size of M*M;

$H^k$ identifies a channel matrix corresponding to the kth subcarrier and has a size of M*M;

$Feq^k$ identifies an FEQ (Frequency Domain Equalizer, frequency domain equalizer) matrix of the kth subcarrier and has a size of M*M, and $Feq^k$ is a diagonal matrix and has a function of restoring a received signal into a transmit signal, a downlink FEQ is implemented in a transceiver of the receiving party, and a theoretical value thereof is a reciprocal of a diagonal of $H^k$;

$x^k$ identifies transmit signals of the M transceivers of the sending party on the kth subcarrier before passing through a canceller and has a size of M*1;

$x'^k$ identifies transmit signals of the M transceivers of the sending party on the kth subcarrier after passing through a canceller and has a size of M*1;

$y^k$ identifies received signals of the M transceivers of the receiving party on the kth subcarrier and has a size of M*1; and $\gamma^k$ identifies noise signals of the M transceivers of the receiving party on the kth subcarrier and has a size of M*1.

On the kth (k=1 to K) subcarrier, an uplink signal transmission process may be described into the following form:

$$y^k = Feq^k \cdot W^k \cdot (H^k \cdot x^k + \gamma^k) \quad (3)$$

$$\tilde{y}^k = (H^k \cdot x^k + \gamma^k) \quad (4)$$

$$\tilde{y}'^k = W^k \cdot \tilde{y}^k \quad (5)$$

where $W^k$ identifies a cancellation matrix of the kth subcarrier and has a size of M*M;

$H^k$ identifies a channel matrix corresponding to the kth uplink subcarrier and has a size of M*M;

$Feq^k$ identifies an FEQ (Frequency Domain Equalizer, frequency domain equalizer) matrix of the kth subcarrier and has a size of M*M, and $Feq^k$ is a diagonal matrix and has a function of restoring a received signal into a transmit signal, an uplink FEQ is implemented in a transceiver of the receiving party, and a theoretical value thereof is a reciprocal of a diagonal of $H^k$;

$\hat{y}^k$ identifies received signals of the M transceivers of the receiving party on the kth subcarrier and has a size of M*1;

$\hat{y}'^k$ identifies received signals of the M transceivers of the receiving party on the kth subcarrier after passing through a canceller and has a size of M*1; and $\gamma^k$ identifies noise signals of the M transceivers of the receiving party on the kth subcarrier and has a size of M*1.

In addition, according to the method provided in this embodiment, when data transmission is performed, a sending unit for transmitting data is a symbol, time division multiplexing frame or super frame. A length of each time division multiplexing frame is 36 symbols, while 35 of the 36 symbols are data symbols. In addition, in each time division multiplexing frame, a former part is used for sending a downlink signal, a latter part is used for sending an uplink signal, and another symbol is a gap between uplink sending and downlink sending, and is not used for sending any signal. Eight (8) time division multiplexing frames form a super frame, and therefore a length of a super frame is 288 symbols, 280 of which are data symbols. In the 280 data symbols, there are an uplink synchronization symbol and a downlink synchronization symbol, and remaining 278 symbols are data symbols for transmitting data.

In an uplink direction, the method provided in this embodiment of the present invention may limit a value of each element of the cancellation matrix, thereby preventing noise at a receive end from being amplified by the canceller. Therefore, there is also an obvious effect for avoiding an uplink performance loss.

Figure 3:
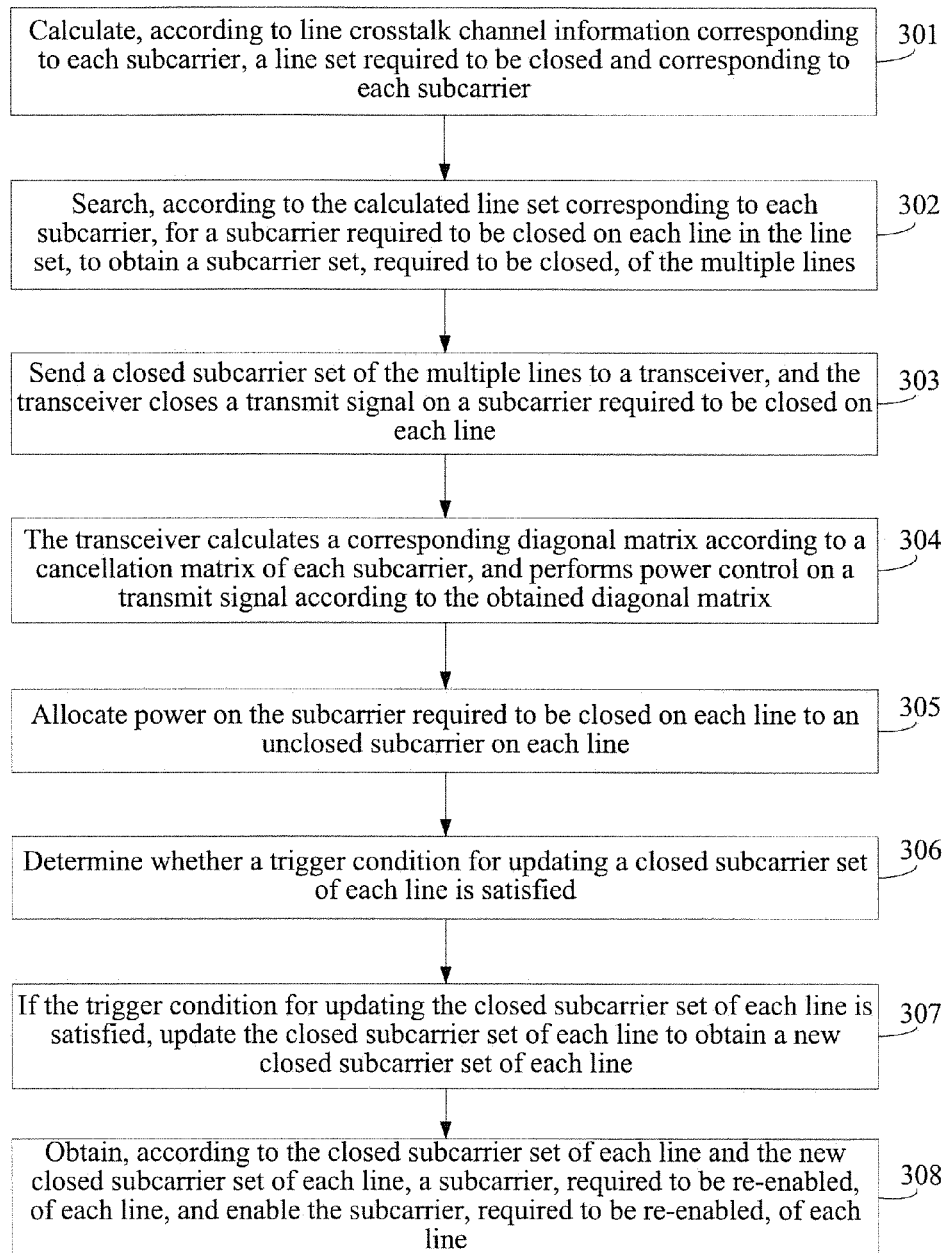
FIG. 3 is a flowchart of a power control method according to Embodiment 2 of the present invention.

With reference to the foregoing content, the power control manner provided in this embodiment is described in detail. Referring to FIG. 3, a process of a method provided in this embodiment includes:

301: Calculate, according to line crosstalk channel information corresponding to each subcarrier, a line set required to be closed and corresponding to each subcarrier.

For the step, the calculating, according to line crosstalk channel information corresponding to each subcarrier, a line set required to be closed and corresponding to each subcarrier includes:

estimating a power gain factor according to the line crosstalk channel information corresponding to each subcarrier, and adding a line that makes the estimated power gain factor greater than a threshold to the line set required to be closed and corresponding to each subcarrier.

An example in which the line crosstalk channel information is a channel matrix is used, and before the line set required to be closed and corresponding to each subcarrier is calculated according to the line crosstalk channel information corresponding to each subcarrier, a channel matrix corresponding to each subcarrier needs to be first obtained, and a specific implementation manner of obtaining the channel matrix corresponding to each subcarrier may be implemented according to an existing obtaining manner. An example in which is a channel matrix corresponding to the kth subcarrier is obtained is used, and a sending party first sends an orthogonal pilot sequence to a receiving party on a synchronization symbol of the kth subcarrier, and obtains an error sampling value returned by the receiving party according to the orthogonal pilot sequence, and then, a VCE may estimate the channel matrix $H^k$ or $H_{eq}^k$ corresponding to the kth subcarrier according to the orthogonal pilot sequence and the error sampling value, where $H_{eq}^k$ is a normalized channel matrix, all values of elements of a diagonal of $H_{eq}^k$ are 1.

In addition, there may be three implementation manners of the estimating a power gain factor according to the line crosstalk channel information corresponding to each subcarrier, and adding a line that makes the estimated power gain factor greater than a threshold to the line set required to be closed and corresponding to each subcarrier, and which calculation manner is specifically used may depend on a specific situation, which is not specifically limited in this embodiment.

First Manner: Specific Steps of this Manner are as Follows:

step a1: calculating, according to a channel matrix corresponding to any subcarrier, a cancellation matrix $P^k$ of the any subcarrier, and using each element in $P^k$ as an estimated power gain factor;

step b1: determining whether each element in $P^k$ of the any subcarrier is greater than a first preset threshold; and step c1: if an element $P^k_{ij}$ in $P^k$ of the any subcarrier is greater than the first preset threshold, adding a line with a lower priority of a line i and a line j to a line set required to be closed and corresponding to the any subcarrier, where $P^k_{ij}$ denotes an element of the ith row and the jth column in $P^k$, and denotes a cancellation coefficient of crosstalk of the line j to the line i.

After the adding a line with a lower priority of a line i and a line j to a line set required to be closed and corresponding to the any subcarrier, the method provided in this embodiment further includes:

if the line i is added to the line set required to be closed and corresponding to the any subcarrier, removing the ith row and the ith column of the channel matrix corresponding to the any subcarrier, and repetitively performing step a1 to step c1 on remaining submatrices, until all elements in $P^k$ of the any subcarrier are less than the first preset threshold; or if the line j is added to the line set required to be closed and corresponding to the any subcarrier, removing the jth row and the jth column of the channel matrix corresponding to the any subcarrier, and repetitively performing step a1 to step c1 on remaining submatrices, until all elements in $P^k$ of the any subcarrier are less than the first preset threshold.

A value of the first preset threshold may specifically be 1. Certainly, in addition to the foregoing value, the value of the first preset threshold may further be another value, such as 2 or 3, and the value of the first preset threshold is not specifically limited in this embodiment.

For this manner, the following formula may be obtained according to the foregoing formula (1):

$$x_i'^k = P_{ij}^k x_j^k$$

That is, on the kth subcarrier, a transmit signal of the line j generates interference to a transmit signal of the line i, and to eliminate the interference, the transmit signal of the line i or the transmit signal of the line j on the kth subcarrier needs to be set to 0, that is, the line i or the line j on the kth subcarrier is closed. If the line i is closed, because an element of the ith row and an element of the ith column in the channel matrix separately denote interference generated by another line to the line i and interference generated by the line i to another line, all the elements of the ith row and the ith column in the channel matrix are removed; while if the line j is closed, because an element of the jth row and an element of the jth column in the channel matrix separately denote interference generated by another line to the line j and interference generated by the line j to another line, all the elements of the jth row and the jth column in the channel matrix are removed. Step a1 to step c1 are repetitively performed, until all the elements in $P^k$ of the any subcarrier are less than the first preset threshold, and the closed line set of the kth subcarrier may be calculated.

Second Manner: Specific Steps of this Manner are as Follows:

step a2: selecting an index submatrix corresponding to a channel matrix corresponding to any subcarrier, and calculating a power gain factor PI (i, j) of the index submatrix;

step b2: determining whether the power gain factor PI (i, j) of the index submatrix is greater than a second preset threshold; and step c2: if the power gain factor PI (i, j) of the index submatrix is greater than the second preset threshold, adding a line with a lower priority of a line i and a line j to a line set required to be closed and corresponding to the any subcarrier.

After the adding a line with a lower priority of a line i and a line j to a line set required to be closed and corresponding to the any subcarrier, the method provided in this embodiment further includes:

if the line i is added to the any subcarrier, removing the ith row and the ith column of the channel matrix corresponding to the any subcarrier, selecting another index submatrix corresponding to the channel matrix corresponding to the any subcarrier, and sequentially performing step a2 to step c2 on the index submatrix, until all lines are traversed; or if the line j is added to the line set required to be closed and corresponding to the any subcarrier, removing the jth row and the jth column of the channel matrix corresponding to the any subcarrier, selecting another index submatrix corresponding to the channel matrix corresponding to the any subcarrier, and sequentially performing step a2 to step c2 on the index submatrix, until all lines are traversed.

A value of the second preset threshold may specifically be 2. Certainly, in addition to the foregoing value, the value of the second preset threshold may further be another value, such as 1 or 3, and the value of the second preset threshold is not specifically limited in this embodiment.

For this manner, if a size of the index submatrix is 2*2, and a channel matrix $H^k$ of the kth subcarrier is used as an example, the index submatrix of $H_k$ is $$\begin{bmatrix} H_{ii}^k & H_{ij}^k \\ H_{ji}^k & H_{jj}^k \end{bmatrix},$$

and a power control factor of the index submatrix is:

$$PI(i, j) = \frac{\sqrt{h11 \cdot h22 + \max(|h12|^2, |h21|^2)}}{|h12 \cdot h21 - 1|}$$

where h11 refers to an element of the first row and the first column in the index submatrix, h22 refers to an element of the second row and the second column, h12 refers to an element of the first row and the second column, and h21 refers to an element of the second row and the first column.

A size of a channel matrix of each subcarrier is M*M, while the size of the index submatrix is 2*2, and therefore an operation needs to be performed for M (M−1)/2 times before M lines can be completely traversed, and after the M lines are completely traversed, a closed line set of the kth subcarrier may be obtained. In addition, for this manner, a closed line set of each subcarrier is directly calculated according to the channel matrix corresponding to each subcarrier, and therefore compared with the first manner, the calculation amount of this manner is reduced from $O(M^3)$ to M(M−1)/2, and is reduced by one order of magnitude.

Third Manner: Specific Steps of this Manner are as Follows:

step a3: decomposing a channel matrix corresponding to any subcarrier to obtain a unitary matrix and a triangular matrix, and calculating a value of a minimum element of a modulus value of a diagonal of the triangular matrix, and/or calculating a ratio of the value of the minimum element of the modulus value of the diagonal of the triangular matrix to a length of a vector formed by the kth column in a channel matrix corresponding to the element, where a reciprocal of the value of the minimum element of the modulus value of the diagonal of the triangular matrix, and/or a reciprocal of the ratio of the value of the minimum element of the modulus value of the diagonal of the triangular matrix to the length of the vector formed by the kth column in the channel matrix corresponding to the element is a power gain factor;

step b3: determining whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and step c3: if the value of the minimum element of the modulus value is less than the third preset threshold, and/or the ratio of the value of the minimum element of the modulus value to the length of the vector formed by the kth column in the channel matrix corresponding to the element is less than the fourth preset threshold, adding a line j corresponding to the minimum element to a line set required to be closed and corresponding to the any subcarrier.

After the adding a line j corresponding to the minimum element to a line set required to be closed and corresponding to the any subcarrier, the method provided in this embodiment further includes:

removing the jth row and the jth column of the channel matrix corresponding to the any subcarrier, and repetitively performing step a3 to step c3 on remaining submatrices, until the value of the minimum element of the modulus value is less than the third preset threshold, and/or the ratio of the value of the minimum element of the modulus value to the length of the vector formed by the kth column in the channel matrix corresponding to the element is less than the fourth preset threshold.

A value of the third preset threshold may specifically be 3. Certainly, in addition to the foregoing value, the value of the third preset threshold may further be another value, such as 1 or 2, and the value of the third preset threshold and a value of the fourth preset threshold are not specifically limited in this embodiment.

For this manner, when the channel matrix corresponding to the any subcarrier is decomposed, a correspondence between each element and each line in the triangular matrix may be recorded by using a twiddle factor. When it is determined that the value of the minimum element of the modulus value is less than the third preset threshold, and/or the ratio of the value of the minimum element of the modulus value to the length of the vector formed by the kth column in the channel matrix corresponding to the element is less than the fourth preset threshold, the line j corresponding to the minimum element may be found according to the correspondence, and then is added to the line set required to be closed and corresponding to the any subcarrier, elements of the jth row and the jth column of the channel matrix corresponding to the any subcarrier are removed, and step a3 to step c3 are repetitively performed on remaining submatrices, until the value of the minimum element of the modulus value is less than the third preset threshold, and/or the ratio of the value of the minimum element of the modulus value to the length of the vector formed by the kth column in the channel matrix corresponding to the element is less than the fourth preset threshold.

Further, to implement line closing according to a priority sequence, when a channel matrix corresponding to any subcarrier is decomposed, a row corresponding to a line with a higher priority in the channel matrix may be arranged in front of a row corresponding to a line with a lower priority, and a value of an element of a triangular matrix obtained according to this decomposing manner is related to an arrangement sequence of elements in the channel matrix, that is, a line corresponding to a row arranged in front in the channel matrix obtains a relatively large element more easily, while a line corresponding to a row arranged in front of the channel matrix has a high priority. In addition, when line closing is performed, a line corresponding to a minimum element is added to a line set required to be closed and corresponding to any subcarrier, and therefore, a to-be-closed line may be added, according to a line priority sequence in the foregoing manner, to the line set required to be closed and corresponding to the any subcarrier.

It should be noted that, in the process of calculating a closed line set of each subcarrier in the foregoing three manners, the method provided in this embodiment further includes: a step of setting a priority of each line for each line. Generally, the following three modes may be used for a priority setting manner:

Activated (showtime) line preference mode: a priority of an activated line is set to be higher than a priority of a newly added line. By using this mode, it may be ensured that fluctuation of a sending rate of the activated line is relatively small.

Subcarrier alternating mode: different priorities are set for a same line on different subcarriers. A line with a symbol of m1 and a line with a symbol of m2 are used as an example. A priority of the line m1 may be set to be higher than a priority of the line m2 on odd-number subcarriers, while the priority of the line m1 may be set to be lower than the priority of the line m2 on even-number subcarriers. Performance of all lines may be balanced by using this mode, and therefore, excessively large fluctuation of performance of some lines can be avoided.

User setting mode: an operator may set a priority of a line corresponding to a user having a high data transmission rate requirement to be a high priority according to a user service demand.

For the foregoing three priority setting modes, when setting of a priority of each line is performed, one of the foregoing three priority setting modes may be randomly selected. No matter which one of the foregoing modes is used to set a line priority, the step of setting a line priority only needs to be performed when the method provided in this embodiment is initially performed, the step does not need to be performed again when the method provided in this embodiment is subsequently performed again, and only when the priority of each line needs to be adjusted, the step of setting the priority of each line is performed.

302: Search, according to the calculated line set corresponding to each subcarrier, for a subcarrier required to be closed on each line in the line set, to obtain a subcarrier set, required to be closed, of the multiple lines.

For the step, an example in which M=4, and K=2, that is, 4 lines exist and are separately identified by using symbols a, b, c, and d, and two subcarriers exist and are separately identified by using symbols 1 and 2, and a line set, required to be closed and corresponding to each subcarrier, calculated by using step 301 is shown in Table 1 is used:

TABLE 1

| Carrier name | Line set required to be closed |
| --- | --- |
| Carrier 1 | Line a, line b, and line c |
| Carrier 2 | Line b and line c |

Then, searching may be performed in Table 1 according to an identifier of each line, and if a line set required to be closed exists on a subcarrier, it indicates that the line does not perform signal sending on the subcarrier, and therefore, the subcarrier is added to a closed subcarrier set of the line. After the searching for the line set required to be closed and corresponding to each subcarrier in Table 1 is completed, a closed subcarrier set of each line may be obtained. For example, it may be learned according to Table 1 that, a closed subcarrier set of a line a includes a subcarrier 1, both a closed subcarrier set of a line b and a closed subcarrier set of a line c include the subcarrier 1 and a subcarrier 2, while a closed subcarrier set of a line d is a null set, that is, it indicates that the line d may send a signal on both the subcarrier 1 and the subcarrier 2.

303: Send a closed subcarrier set of the multiple lines to a transceiver, and the transceiver closes a transmit signal on a subcarrier required to be closed on each line.

For the step, the closing, by the transceiver, a transmit signal on a subcarrier required to be closed on each line includes closing a data symbol transmit signal on the subcarrier required to be closed on each line, and opening a synchronization symbol transmit signal. Table 1 in step 302 is still used as an example. Then, after the closed subcarrier set of the line a is obtained, a transmit signal on a data symbol of the subcarrier 1 corresponding to the line a is set to 0, and after the closed subcarrier set of the line b is obtained, a transmit signal on a data symbol of the subcarrier 1 corresponding to the line b is set to 0, a transmit signal on a data symbol of the subcarrier 2 corresponding to the line b is set to 0, a transmit signal on a data symbol of the subcarrier 1 corresponding to the line c is set to 0, and a transmit signal on a data symbol of the subcarrier 2 corresponding to the line c is set to 0.

In addition, the transceiver calculates a corresponding diagonal matrix according to a cancellation matrix of each subcarrier, and performs power control on a transmit signal according to the obtained diagonal matrix. The transceiver may be a local transceiver, or may be a remote transceiver. During specific implementation, a local transceiver calculates a corresponding diagonal matrix in an uplink direction, and a remote transceiver calculates a corresponding diagonal matrix in a downlink direction. Only a method for calculating a closed subcarrier set of each line in a downlink direction is provided in step 301 to step 303, and in an uplink direction, a cancellation matrix W is also calculated according to each channel matrix likewise, and therefore, a manner of obtaining a closed subcarrier set of each line is the same as that in the downlink direction. Different from the downlink direction, a first preset threshold to a fourth preset threshold in the downlink direction denote power added values, while corresponding first preset threshold to fourth preset threshold in the uplink direction denote noise added values. When a subcarrier signal in the uplink direction needs to be closed, a closing manner in the uplink direction is also consistent with that in the downlink direction.

It should be noted that, the closed subcarrier set of each line may be obtained according to step 301 to step 303, and the transmit signal on the subcarrier required to be closed on each line may be successfully closed. When a line set required to be closed and corresponding to any subcarrier is determined according to step 301, rows and columns, corresponding to a closed line in the line set required to be closed and corresponding to the any subcarrier, in a channel matrix corresponding to the any subcarrier are removed, and therefore, after the line set required to be closed and corresponding to the any subcarrier is obtained, a quantity of rows and columns of the channel matrix corresponding to the any subcarrier is a quantity of unclosed lines of the any subcarrier, and a cancellation matrix of the any subcarrier may be obtained by performing inversion on the current channel matrix. After the cancellation matrix is obtained, power control may be performed on the transmit signal, and for a detailed process, reference may be made to step 304.

304: The transceiver calculates a corresponding diagonal matrix according to a cancellation matrix of each subcarrier, and performs power control on a transmit signal according to the obtained diagonal matrix.

For the step, an example in which a quantity of lines in a line set required to be closed and corresponding to the kth subcarrier is M1 and a quantity of unclosed lines is M2 is used, and a size of a cancellation matrix of the kth subcarrier is obtained, that is, M2*M2. Then, a diagonal matrix of the kth subcarrier may be calculated, and a specific calculation manner of the diagonal matrix may be implemented according to an existing calculation manner. For example, to ensure that a signal $x^k$ of an unclosed line before precoding is performed satisfies a power limitation, a sum of squares of rows of a cancellation matrix between unclosed lines needs to be less than 1. That is, power is scaled (Scale) by using a diagonal matrix, so that a sum of squares of rows of a matrix obtained by multiplying the two is less than 1.

A normalized channel matrix $$H_{eq} = \begin{bmatrix} 1 & 0.9 \\ 0.9 & 1 \end{bmatrix}$$

is used as an example, and then a cancellation matrix may be obtained by performing inversion on the normalized channel matrix:

$$P = \text{inverse}\left(\begin{bmatrix} 1 & 0.9 \\ 0.9 & 1 \end{bmatrix}\right) = \begin{bmatrix} 5.26 & -4.74 \\ -4.74 & 5.26 \end{bmatrix}$$

To control power of transmit signal that has undergone precoding, a diagonal matrix required to be used is:

$$D = \begin{bmatrix} 0.141 & 0 \\ 0 & 0.141 \end{bmatrix},$$

where $0\ 0.141 = 1/\sqrt{5.26^2 + (-4.74)^2}$. Additionally, it should be noted that, D herein and a power gain factor PI (i, j) in this embodiment are reciprocals of each other.

The kth subcarrier is used as an example, and then $$y^k = ((D^k)^{-1} \cdot \text{Feq}^k) \cdot (H^k \cdot P^k \cdot D^k \cdot x^k + \gamma^k)$$

$D^k$ is a diagonal matrix, which is equivalent to scaling power of a transmit signal of each line before precoding individually, and therefore, power control may be implemented in a transceiver of the sending party, a power control factor $gi^k$ is first set, then a value of $gi^k$ is calculated by using a formula $gi^k \leq D^k$, and after the power control factor is obtained, power control may be implemented by multiplying the power control factor by the transmit signal.

In addition to the foregoing power control manner, $P^k \cdot D^k$ may further be directly used as a new cancellation matrix, the canceller of the sending party performs precoding on the transmit signal according to the new cancellation matrix, so as to implement power control on the transmit signal, that is, implement power control on the canceller instead of the transceiver. For the foregoing two power control manners, which manner is specifically used to perform power control on the transmit signal is not limited in this embodiment.

305: Allocate power on the subcarrier required to be closed on each line to an unclosed subcarrier on each line.

Specifically, because a sum of transmit power of all subcarriers for any line is fixed, after the transmit signal on each subcarrier required to be closed is closed according to step 303, to optimize system performance and improve power utilization, by using the method provided in this embodiment, transmit power of each subcarrier in a closed subcarrier set of the line is allocated to an unclosed subcarrier on the line. A specific allocation manner may be implemented in an existing allocation manner, and is not specifically limited in this embodiment. For example, higher power is allocated to a subcarrier with lower power, while lower power is allocated to a subcarrier with higher power.

In addition, if the subcarrier required to be closed on each line is blindly closed, performance of each line is increasingly low, which is not conducive to system performance optimization. To ensure the system performance, the method provided in this implementation further includes a step of re-enabling a closed subcarrier of the closed subcarrier set of each line, and for details, reference may be made to step 306 to step 308.

306: Determine whether a trigger condition for updating a closed subcarrier set of each line is satisfied.

The step of determining whether a trigger condition for updating a closed subcarrier set of each line is satisfied includes but is not limited to the following manner:

when a new line is added, determining that the trigger condition for updating the closed subcarrier set of each line is satisfied; or when an original line leaves, including occurrence of a DLE (Disorderly Leaving event, disorderly leaving event) and an OLE (Orderly Leaving Event, orderly leaving event), determining that the trigger condition for updating the closed subcarrier set of each line is satisfied; or when a power status of an original line changes, that is, the line is switched among a full power mode (L0 state), an LPM (Low Power Mode, low power mode), and a DM (Discontinuous sending Mode, discontinuous sending mode), or switched between two different discontinuous sending modes, determining that the trigger condition for updating the closed subcarrier set of each line is satisfied; or when a channel matrix is updated, determining that the trigger condition for updating the closed subcarrier set of each line is satisfied.

307: If the trigger condition for updating the closed subcarrier set of each line is satisfied, update the closed subcarrier set of each line to obtain a new closed subcarrier set of each line.

To ensure subsequent availability of a closed subcarrier in the closed subcarrier set of each line, before the updating the closed subcarrier set of each line to obtain a new closed subcarrier set of each line, the method provided in this embodiment further includes:

sending a non-zero signal on a synchronization symbol of a closed subcarrier in the closed subcarrier set of each line, where the non-zero signal includes at least a pilot signal; and re-calculating a channel matrix of each line of all subcarriers according to each pilot signal, where the updating the closed subcarrier set of each line to obtain a new closed subcarrier set of each line includes but is not limited to the following manner:

updating the closed subcarrier set of each line according to the channel matrix of each line of each subcarrier, to obtain the new closed subcarrier set of each line.

For a specific implementation manner of updating the closed subcarrier set of each line according to the channel matrix of each line of each subcarrier, reference may be made to the manner, provided in step 301 to step 302, of calculating a closed subcarrier set of each line, and details are not repeatedly described herein.

308: Obtain, according to the closed subcarrier set of each line and the new closed subcarrier set of each line, a subcarrier, required to be re-enabled, of each line, and enable the subcarrier, required to be re-enabled, of each line.

With reference to a specific example, a specific implementation manner of the obtaining, according to the closed subcarrier set of each line and the new closed subcarrier set of each line, a subcarrier, required to be re-enabled, of each line is described in detail.

An example in which before the closed subcarrier set of the line a is updated, the subcarrier 1, the subcarrier 2, and a subcarrier 3 exist in the closed subcarrier set of the line a, while after the closed subcarrier set of the line a is updated, the subcarrier 1 and the subcarrier 2 exist in a new closed subcarrier set of the line a is used, and then after an intersection set of the two closed subcarrier sets is taken, it may be known that both the subcarrier 1 and the subcarrier 2 exist in the two closed subcarrier sets, while the subcarrier 3 does not exist in the new closed subcarrier set of the line a, and therefore, the subcarrier 3 is used as a subcarrier, required to be re-enabled, of the line a.

The enabling the subcarrier, required to be re-enabled, of each line includes but is not limited to:

enabling signal sending on a data symbol of a closed subcarrier of each line according to current line crosstalk channel information of the closed subcarrier of each line.

The current line crosstalk channel information includes at least a frequency domain equalizer parameter and a signal-to-noise ratio, and the current line crosstalk channel information of the closed subcarrier of each line is calculated according to a non-zero signal sent on a synchronization symbol of the closed subcarrier of each line.

According to the method provided in this embodiment, a closed subcarrier set of each line is calculated by using a channel matrix corresponding to each subcarrier, and the closed subcarrier set is sent to a transceiver, so that the transceiver closes a transmit signal on a subcarrier required to be closed on each line, so as to ensure performance of remaining lines, and bring a more desirable effect when a diagonal matrix is calculated according to a precoding matrix of an unclosed line of each subcarrier to perform power control. In addition, after the transmit signal on the subcarrier required to be closed on each line is closed, to keep system performance, when a trigger condition for updating the closed subcarrier set of each line is satisfied, the transmit signal on the closed subcarrier in the closed subcarrier set of each line may be further re-restored, and therefore, a power control manner is more flexible, and the system performance is more optimized.

Embodiment 3

Figure 4:
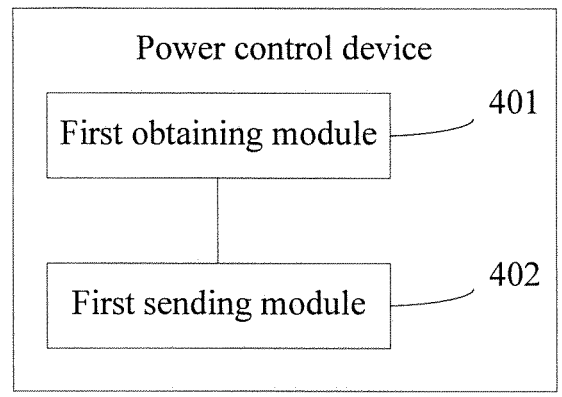
FIG. 4 is a schematic structural diagram of a first power control device according to Embodiment 3 of the present invention.

This embodiment of the present invention provides a power control device, which is configured to perform the method provided in Embodiment 1 or Embodiment 2, and is applied to a vectoring system, where the vectoring system includes multiple lines, each line includes multiple subcarriers, and for each subcarrier, a crosstalk channel is formed between the multiple lines. Referring to FIG. 4, the device includes:

a first obtaining module 401, configured to obtain a closed subcarrier set of the multiple lines according to line crosstalk channel information corresponding to each subcarrier of the multiple subcarriers, where the closed subcarrier set includes a subcarrier set required to be closed on the multiple lines; and a first sending module 402, configured to send the closed subcarrier set of the multiple lines obtained by the obtaining module 401 to a transceiver, where the transceiver closes a transmit signal on a subcarrier required to be closed on each line, so as to perform power control.

Figure 5:
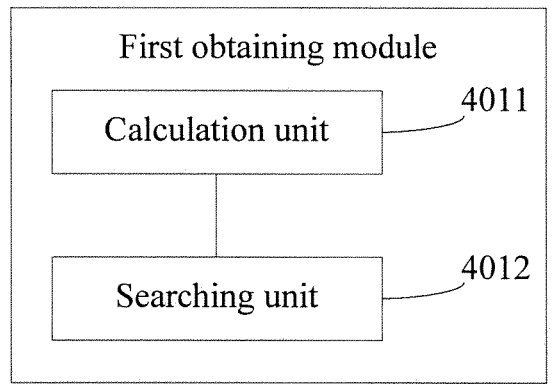
FIG. 5 is a schematic diagram of an internal structure of a first obtaining module according to Embodiment 3 of the present invention.

Further, referring to FIG. 5, the first obtaining module 401 includes:

a calculation unit 4011, configured to calculate, according to the line crosstalk channel information corresponding to each subcarrier, a line set required to be closed and corresponding to each subcarrier; and a searching unit 4012, configured to search, according to the line set that is corresponding to each subcarrier and that is calculated by the calculation unit 4011, for a subcarrier required to be closed on each line in the line set, to obtain the subcarrier set, required to be closed, of the multiple lines.

Further, the calculation unit 4011 is configured to estimate a power gain factor according to the line crosstalk channel information corresponding to each subcarrier, and add a line that makes the estimated power gain factor greater than a threshold to the line set required to be closed and corresponding to each subcarrier.

Further, the line crosstalk channel information corresponding to each subcarrier includes a channel matrix corresponding to each subcarrier, and the calculation unit 4011 is configured to: calculate, according to a channel matrix corresponding to any subcarrier, a cancellation matrix $P^k$ of the any subcarrier, and use each element in $P^k$ as an estimated power gain factor; determine whether each element in $P^k$ of the any subcarrier is greater than a first preset threshold; and if an element $P^k_{ij}$ in $P^k$ of the any subcarrier is greater than the first preset threshold, add a line with a lower priority of a line i and a line j to a line set required to be closed and corresponding to the any subcarrier, where $P^k_{ij}$ denotes a cancellation coefficient of crosstalk of the line j to the line i.

Further, the calculation unit 4011 is further configured to: if the line i is added to the line set required to be closed and corresponding to the any subcarrier, remove the ith row and the ith column of the channel matrix corresponding to the any subcarrier, and repetitively perform the following steps on remaining submatrices: determining whether each element in $P^k$ of the any subcarrier is greater than a first preset threshold; and if an element $P^k_{ij}$ in $P^k$ of the any subcarrier is greater than the first preset threshold, adding a line with a lower priority of a line i and a line j to a line set required to be closed and corresponding to the any subcarrier, until all elements in $P^k$ of the any subcarrier are less than the first preset threshold; or the calculation unit 4011 is further configured to: if the line j is added to the line set required to be closed and corresponding to the any subcarrier, remove the jth row and the jth column of the channel matrix corresponding to the any subcarrier, and repetitively perform the following steps on remaining submatrices: determining whether each element in $P^k$ of the any subcarrier is greater than a first preset threshold; and if an element $P^k_{ij}$ in $P^k$ of the any subcarrier is greater than the first preset threshold, adding a line with a lower priority of a line i and a line j to a line set required to be closed and corresponding to the any subcarrier, until all elements in $P^k$ of the any subcarrier are less than the first preset threshold.

Further, the calculation unit 4011 is configured to: select an index submatrix corresponding to a channel matrix corresponding to any subcarrier, and calculate a power gain factor PI (i, j) of the index submatrix; determine whether the power gain factor PI (i, j) of the index submatrix is greater than a second preset threshold; and if the power gain factor PI (i, j) of the index submatrix is greater than the second preset threshold, add a line with a lower priority of a line i and a line j to a line set required to be closed and corresponding to the any subcarrier.

Further, the calculation unit 4011 is further configured to: if the line i is added to the line set required to be closed and corresponding to the any subcarrier, remove the ith row and the ith column of the channel matrix corresponding to the any subcarrier, select another index submatrix corresponding to the channel matrix corresponding to the any subcarrier, and perform the following steps: selecting an index submatrix corresponding to a channel matrix corresponding to any subcarrier and calculating a power gain factor PI (i, j) of the index submatrix; determining whether the power gain factor PI (i, j) of the index submatrix is greater than a second preset threshold; and if the power gain factor PI (i, j) of the index submatrix is greater than the second preset threshold, adding a line with a lower priority of a line i and a line j to a line set required to be closed and corresponding to the any subcarrier, until all lines are traversed; or the calculation unit 4011 is further configured to: if the line j is added to the line set required to be closed and corresponding to the any subcarrier, remove the jth row and the jth column of the channel matrix corresponding to the any subcarrier, select another index submatrix corresponding to the channel matrix corresponding to the any subcarrier, and perform the following steps: selecting an index submatrix corresponding to a channel matrix corresponding to any subcarrier and calculating a power gain factor PI (i, j) of the index submatrix; determining whether the power gain factor PI (i, j) of the index submatrix is greater than a second preset threshold; and if the power gain factor PI (i, j) of the index submatrix is greater than the second preset threshold, adding a line with a lower priority of a line i and a line j to a line set required to be closed and corresponding to the any subcarrier, until all lines are traversed.

Further, the calculation unit 4011 is configured to: decompose a channel matrix corresponding to any subcarrier to obtain a unitary matrix and a triangular matrix, and calculate a value of a minimum element of a modulus value of a diagonal of the triangular matrix, and/or calculate a ratio of the value of the minimum element of the modulus value of the diagonal of the triangular matrix to a length of a vector formed by the kth column in a channel matrix corresponding to the element, where a reciprocal of the value of the minimum element of the modulus value of the diagonal of the triangular matrix, and/or a reciprocal of the ratio of the value of the minimum element of the modulus value of the diagonal of the triangular matrix to the length of the vector formed by the kth column in the channel matrix corresponding to the element is a power gain factor; determine whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and if the value of the minimum element of the modulus value is less than the third preset threshold, and/or the ratio of the value of the minimum element of the modulus value to the length of the vector formed by the kth column in the channel matrix corresponding to the element is less than the fourth preset threshold, add a line j corresponding to the minimum element to a line set required to be closed and corresponding to the any subcarrier.

Further, the calculation unit 4011 is further configured to: remove the jth row and the jth column of the channel matrix corresponding to the any subcarrier, and repetitively perform the following steps on remaining submatrices: decomposing a channel matrix corresponding to any subcarrier to obtain a unitary matrix and a triangular matrix, and calculating a value of a minimum element of a modulus value of a diagonal of the triangular matrix, and/or calculating a ratio of the value of the minimum element of the modulus value of the diagonal of the triangular matrix to a length of a vector formed by the kth column in a channel matrix corresponding to the element; determining whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and if the value of the minimum element of the modulus value is less than the third preset threshold, and/or the ratio of the value of the minimum element of the modulus value to the length of the vector formed by the kth column in the channel matrix corresponding to the element is less than the fourth preset threshold, adding a line j corresponding to the minimum element to a line set required to be closed and corresponding to the any subcarrier, until the value of the minimum element of the modulus value is less than the third preset threshold, and/or the ratio of the value of the minimum element of the modulus value to the length of the vector formed by the kth column in the channel matrix corresponding to the element is less than the fourth preset threshold.

Figure 6:
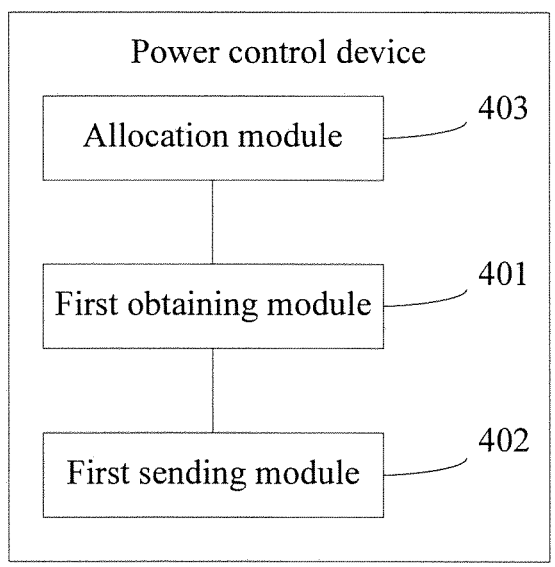
FIG. 6 is a schematic structural diagram of a second power control device according to Embodiment 3 of the present invention.

Further, referring to FIG. 6, the device further includes: an allocation module 403, configured to allocate power on the subcarrier required to be closed on each line to an unclosed subcarrier on each line.

Figure 7:
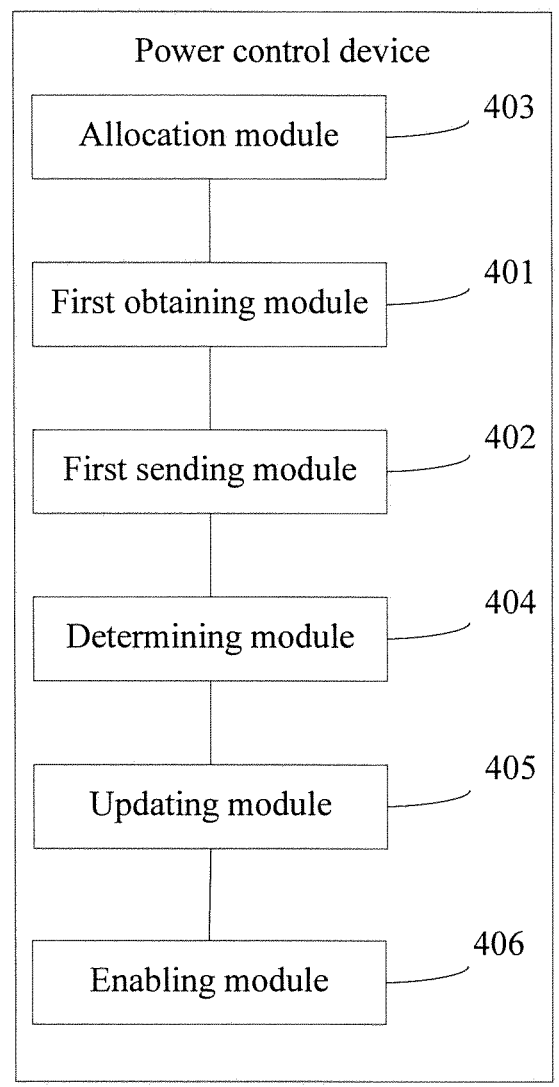
FIG. 7 is a schematic structural diagram of a third power control device according to Embodiment 3 of the present invention.

Further, referring to FIG. 7, the device further includes:
a determining module 404, configured to determine whether a trigger condition for updating a closed subcarrier set of each line is satisfied;

an updating module 405, configured to: when the determining module 404 determines that the trigger condition for updating the closed subcarrier set of each line is satisfied, updating the closed subcarrier set of each line to obtain a new closed subcarrier set of each line; and an enabling module 406, configured to obtain, according to the closed subcarrier set of each line obtained by the first obtaining module 401 and the new closed subcarrier set of each line obtained by the updating module 405, a subcarrier, required to be re-enabled, of each line, and enabling the subcarrier, required to be re-enabled, of each line.

Further, the determining module 404 is configured to: when a new line is added, determine that the trigger condition for updating the closed subcarrier set of each line is satisfied; or when an original line leaves, determine that the trigger condition for updating the closed subcarrier set of each line is satisfied; or when a power status of an original line changes, determine that the trigger condition for updating the closed subcarrier set of each line is satisfied; or when a channel matrix is updated, determine that the trigger condition for updating the closed subcarrier set of each line is satisfied.

Figure 8:
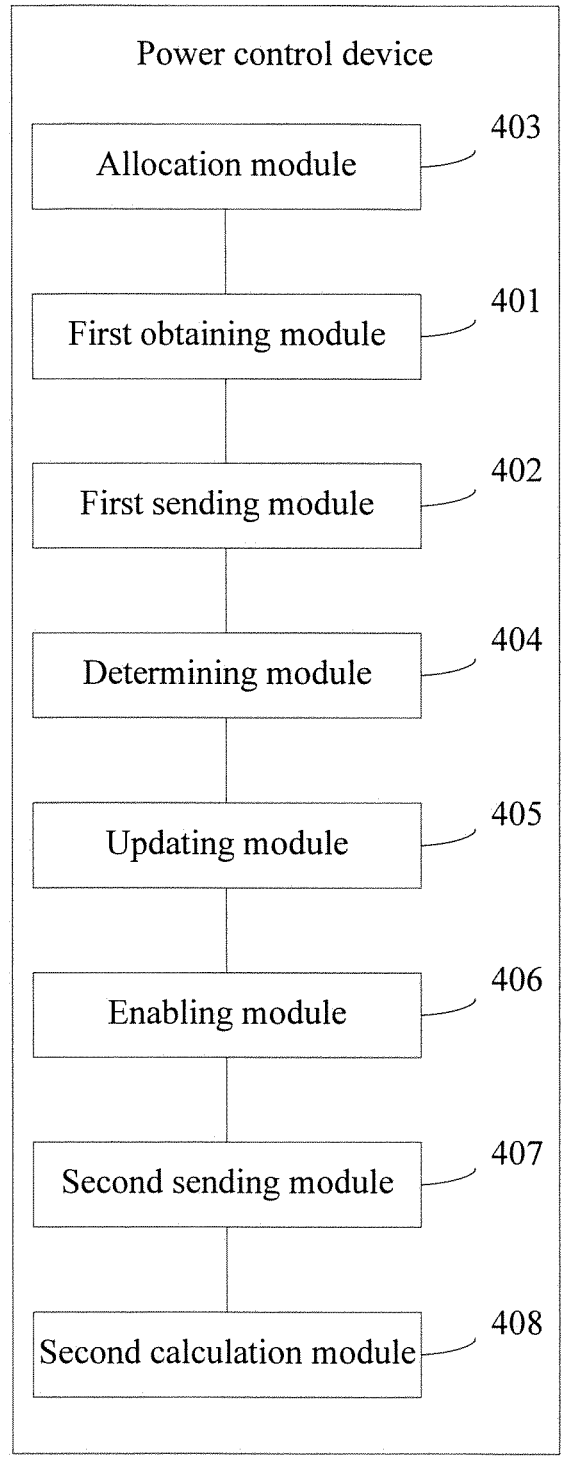
FIG. 8 is a schematic structural diagram of a fourth power control device according to Embodiment 3 of the present invention.

Further, referring to FIG. 8, the device further includes:

a second sending module 407, configured to send a non-zero signal on a synchronization symbol of a closed subcarrier in the closed subcarrier set of each line, where the non-zero signal includes at least a pilot signal; and a second calculation module 408, configured to re-calculate the channel matrix corresponding to each subcarrier according to each pilot signal, where the updating module 405 is configured to update the closed subcarrier set of each line according to the channel matrix that is corresponding to each subcarrier and that is calculated by the second calculation module 408, to obtain the new closed subcarrier set of each line.

According to the device provided in this embodiment, a closed subcarrier set of each line is calculated by using line crosstalk channel information corresponding to each subcarrier, and the closed subcarrier set is sent to a transceiver, so that the transceiver closes a transmit signal on a subcarrier required to be closed on each line, so as to ensure performance of remaining lines, and bring a more desirable effect when power control is performed. In addition, after the transmit signal on the subcarrier required to be closed on each line is closed, to keep system performance, when a trigger condition for updating the closed subcarrier set of each line is satisfied, the transmit signal on the closed subcarrier in the closed subcarrier set of each line may be further re-restored, and therefore, a power control manner is more flexible, and the system performance is more optimized.

Embodiment 4

Figure 9:
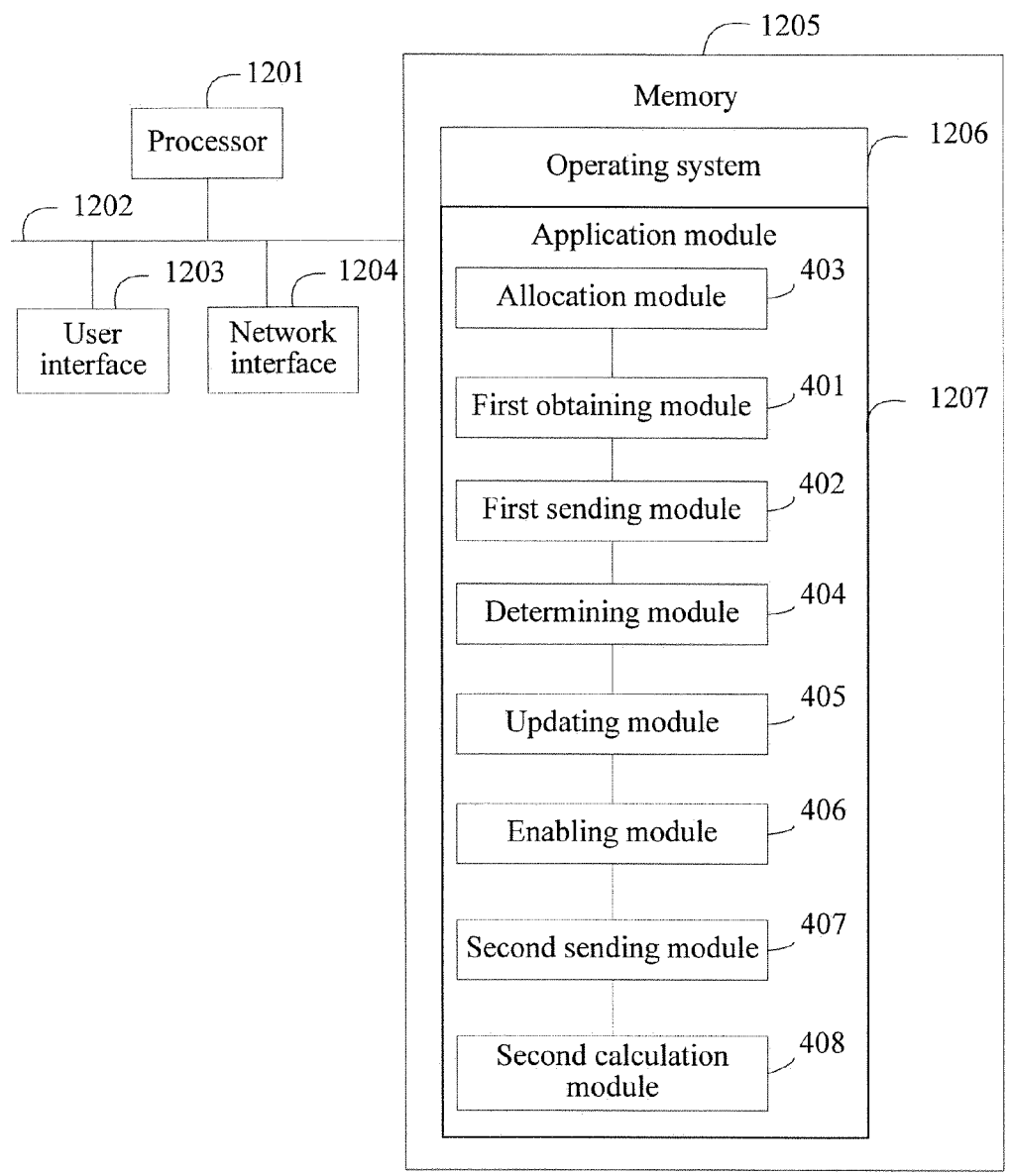
FIG. 9 is a schematic structural diagram of a power control device according to Embodiment 4 of the present invention.

FIG. 9 is a schematic structural diagram of a power control device according to an implementation manner, and the power control device includes at least one processor 1201, such as a CPU, at least one network interface 1204 or another user interface 1203, a memory 1205, and at least one communications bus 1202. The communications bus 1202 is configured to implement connection and communication between these apparatuses. The user interface 1203 may be a display, a keyboard or a clicking device. The memory 1205 may include a high-speed Ram memory, and may also include a non-volatile memory, such as at least one magnetic disk memory. The memory 1205 may optionally include at least one storage apparatus located away from the foregoing CPU 1202. In some implementation manners, the memory 1205 stores the following elements: a module or a data structure, or a subset thereof, or an extension set thereof:

an operating system 1206, including various programs which are used for implementing various basic services and processing a task based on hardware; and an application module 1207, including a first obtaining module 401, a first sending module 402, an allocation module 403, a determining module 404, an updating module 405, an enabling module 406, a second sending module 407, and a second calculation module 408, where for details of functions thereof, reference may be made to content in Embodiment 3, and details are not described again herein.

According to the device provided in this embodiment, a closed subcarrier set of each line is calculated by using line crosstalk channel information corresponding to each subcarrier, and the closed subcarrier set is sent to a transceiver, so that the transceiver closes a transmit signal on a subcarrier required to be closed on each line, so as to ensure performance of remaining lines, and bring a more desirable effect when power control is performed. In addition, after the transmit signal on the subcarrier required to be closed on each line is closed, to keep system performance, when a trigger condition for updating the closed subcarrier set of each line is satisfied, the transmit signal on the closed subcarrier in the closed subcarrier set of each line may be further re-restored, and therefore, a power control manner is more flexible, and the system performance is more optimized.

Embodiment 5

Figure 10:
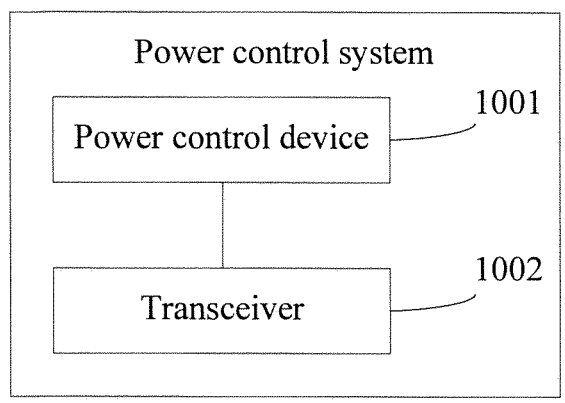
FIG. 10 is a schematic structural diagram of a power control system according to Embodiment 5 of the present invention.

This embodiment provides a power control system. Referring to FIG. 10, the system includes: a power control device 1001 and a transceiver 1002.

The power control device 1001 is the power control device provided in Embodiment 3, and for details, reference may be made to Embodiment 3. The transceiver 1002 is configured to receive a closed subcarrier set of multiple lines sent by the power control device 1001, and close a transmit signal on a subcarrier required to be closed on each line, so as to perform power control.

According to the system provided in this embodiment, a power control device calculates a closed subcarrier set of each line according to line crosstalk channel information corresponding to each subcarrier, and sends the closed subcarrier set to a transceiver, so that the transceiver closes a transmit signal on a subcarrier required to be closed on each line, so as to ensure performance of remaining lines, and bring a more desirable effect when power control is performed. In addition, after the transmit signal on the subcarrier required to be closed on each line is closed, to keep system performance, when a trigger condition for updating the closed subcarrier set of each line is satisfied, the transmit signal on the closed subcarrier in the closed subcarrier set of each line may be further re-restored, and therefore, a power control manner is more flexible, and the system performance is more optimized.

It should be noted that when the power control device provided in the foregoing embodiment performs power control, only division of the foregoing functional modules is used as an example for description. In an actual application, the functions may be assigned by different functional modules according to needs, that is, an internal structure of the device is divided into different functional modules, so as to implement all or a part of the functions described above. In addition, the power control device and system provided by the foregoing embodiments belong to the same idea as the embodiment of the power control method. For details of a specific implementation process thereof, reference may be made to the method embodiment, and the details are not repeatedly described herein.

The sequence numbers of the foregoing embodiments of the present invention are merely for illustrative purposes, and are not intended to indicate priorities of the embodiments. A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A power control method for use in a vectoring system, wherein the vectoring system comprises multiple lines, each line comprises multiple subcarriers, and for each subcarrier, a crosstalk channel is formed between the multiple lines, the method comprising:
   obtaining a closed subcarrier set of the multiple lines according to line crosstalk channel information corresponding to each subcarrier of the multiple subcarriers, wherein the closed subcarrier set comprises a subcarrier set required to be closed on the multiple lines;
   sending the closed subcarrier set of the multiple lines to a transceiver;
   wherein obtaining the closed subcarrier set of the multiple lines comprises:
      calculating, according to the line crosstalk channel information corresponding to each subcarrier, a line set required to be closed and corresponding to each subcarrier, and
      searching, according to the calculated line set corresponding to each subcarrier, for a subcarrier required to be closed on each line in the line set, to obtain the subcarrier set, required to be closed, of the multiple lines;
   wherein calculating the line set required to be closed and corresponding to each subcarrier comprises:
      estimating a power gain factor according to the line crosstalk channel information corresponding to each subcarrier, and adding a line that makes the estimated power gain factor greater than a threshold to the line set required to be closed and corresponding to each subcarrier;
   wherein the line crosstalk channel information corresponding to each subcarrier comprises a channel matrix corresponding to each subcarrier; and
   wherein estimating the power gain factor according to the line crosstalk channel information corresponding to each subcarrier, and adding a line that makes the estimated power gain factor greater than a threshold to the line set required to be closed and corresponding to each subcarrier comprises:
      calculating, according to a channel matrix corresponding to any subcarrier, a cancellation matrix $P^k$ of the any subcarrier, and using each element in $P^k$ as an estimated power gain factor,
      determining whether each element in $P^k$ of the any subcarrier is greater than a first preset threshold, and when an element $P^k_{ij}$ in $P^k$ of the any subcarrier is greater than the first preset threshold, adding a line with a lower priority of a line i and a line j to a line set required to be closed and corresponding to the any subcarrier, wherein $P^k_{ij}$ denotes a cancellation coefficient of crosstalk of the line j to the line i.

2. The method according to claim 1, wherein after adding a line with a lower priority of a line i and a line j to a line set required to be closed and corresponding to the any subcarrier, the method further comprises:
   if the line i is added to the line set required to be closed and corresponding to the any subcarrier, removing the ith row and the ith column of the channel matrix corresponding to the any subcarrier, and repetitively performing step a1 to step c1 on remaining submatrices, until all elements in $P^k$ of the any subcarrier are less than the first preset threshold; or
   if the line j is added to the line set required to be closed and corresponding to the any subcarrier, removing the jth row and the jth column of the channel matrix corresponding to the any subcarrier, and repetitively performing step a1 to step c1 on remaining submatrices, until all elements in $P^k$ of the any subcarrier are less than the first preset threshold.

3. The method according to claim 1, further comprising:
   allocating power on the subcarrier required to be closed on each line to an unclosed subcarrier on each line.

4. A power control method for use in a vectoring system, wherein the vectoring system comprises multiple lines, each line comprises multiple subcarriers, and for each subcarrier, a crosstalk channel is formed between the multiple lines, the method comprising:
   obtaining a closed subcarrier set of the multiple lines according to line crosstalk channel information corresponding to each subcarrier of the multiple subcarriers, wherein the closed subcarrier set comprises a subcarrier set required to be closed on the multiple lines;
   sending the closed subcarrier set of the multiple lines to a transceiver;
   wherein obtaining the closed subcarrier set of the multiple lines comprises:
      calculating, according to the line crosstalk channel information corresponding to each subcarrier, a line set required to be closed and corresponding to each subcarrier, and
      searching, according to the calculated line set corresponding to each subcarrier, for a subcarrier required to be closed on each line in the line set, to obtain the subcarrier set, required to be closed, of the multiple lines;
   wherein calculating the line set required to be closed and corresponding to each subcarrier comprises:
      estimating a power gain factor according to the line crosstalk channel information corresponding to each subcarrier, and adding a line that makes the estimated power gain factor greater than a threshold to the line set required to be closed and corresponding to each subcarrier;
   wherein the line crosstalk channel information corresponding to each subcarrier comprises a channel matrix corresponding to each subcarrier; and
   wherein estimating a power gain factor according to the line crosstalk channel information corresponding to each subcarrier, and adding a line that makes the estimated power gain factor greater than a threshold to the line set required to be closed and corresponding to each subcarrier comprises:

selecting an index submatrix corresponding to a channel matrix corresponding to any subcarrier, and calculating a power gain factor PI (i, j) of the index submatrix, determining whether the power gain factor PI (i, j) of the index submatrix is greater than a second preset threshold, and if the power gain factor PI (i, j) of the index submatrix is greater than the second preset threshold, adding a line with a lower priority of a line i and a line j to a line set required to be closed and corresponding to the any subcarrier.

5. The method according to claim 4, wherein after adding a line with a lower priority of a line i and a line j to a line set required to be closed and corresponding to the any subcarrier, the method further comprises:

if the line i is added to the line set required to be closed and corresponding to the any subcarrier, removing the ith row and the ith column of the channel matrix corresponding to the any subcarrier, selecting another index submatrix corresponding to the channel matrix corresponding to the any subcarrier, and sequentially performing step a2 to step c2 on the index submatrix, until all lines are traversed; or if the line j is added to the line set required to be closed and corresponding to the any subcarrier, removing the jth row and the jth column of the channel matrix corresponding to the any subcarrier, selecting another index submatrix corresponding to the channel matrix corresponding to the any subcarrier, and sequentially performing step a2 to step c2 on the index submatrix, until all lines are traversed.

6. A power control method for use in a vectoring system, wherein the vectoring system comprises multiple lines, each line comprises multiple subcarriers, and for each subcarrier, a crosstalk channel is formed between the multiple lines, the method comprising:

obtaining a closed subcarrier set of the multiple lines according to line crosstalk channel information corresponding to each subcarrier of the multiple subcarriers, wherein the closed subcarrier set comprises a subcarrier set required to be closed on the multiple lines;

sending the closed subcarrier set of the multiple lines to a transceiver;

wherein obtaining the closed subcarrier set of the multiple lines comprises:

calculating, according to the line crosstalk channel information corresponding to each subcarrier, a line set required to be closed and corresponding to each subcarrier, and searching, according to the calculated line set corresponding to each subcarrier, for a subcarrier required to be closed on each line in the line set, to obtain the subcarrier set, required to be closed, of the multiple lines;

wherein calculating the line set required to be closed and corresponding to each subcarrier comprises:

estimating a power gain factor according to the line crosstalk channel information corresponding to each subcarrier, and adding a line that makes the estimated power gain factor greater than a threshold to the line set required to be closed and corresponding to each subcarrier;

wherein the line crosstalk channel information corresponding to each subcarrier comprises a channel matrix corresponding to each subcarrier; and wherein estimating a power gain factor according to the line crosstalk channel information corresponding to each subcarrier, and adding a line that makes the estimated power gain factor greater than a threshold to the line set required to be closed and corresponding to each subcarrier comprises:

decomposing a channel matrix corresponding to any subcarrier to obtain a unitary matrix and a triangular matrix, and calculating a value of a minimum element of a modulus value of a diagonal of the triangular matrix, and/or calculating a ratio of the value of the minimum element of the modulus value of the diagonal of the triangular matrix to a length of a vector formed by the kth column in a channel matrix corresponding to the element, wherein a reciprocal of the value of the minimum element of the modulus value of the diagonal of the triangular matrix, and/or a reciprocal of the ratio of the value of the minimum element of the modulus value of the diagonal of the triangular matrix to the length of the vector formed by the kth column in the channel matrix corresponding to the element is a power gain factor, determining whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold, and if the value of the minimum element of the modulus value is less than the third preset threshold, and/or the ratio of the value of the minimum element of the modulus value to the length of the vector formed by the kth column in the channel matrix corresponding to the element is less than the fourth preset threshold, adding a line j corresponding to the minimum element to a line set required to be closed and corresponding to the any subcarrier.

7. A power control device for use in a vectoring system, wherein the vectoring system comprises multiple lines, each line comprises multiple subcarriers, and for each subcarrier, a crosstalk channel is formed between the multiple lines, the power control device comprising:

a processor; and a memory coupled to the processor, the memory comprising instructions that, when executed by the processor, cause the device to:

obtain a closed subcarrier set of the multiple lines according to line crosstalk channel information corresponding to each subcarrier of the multiple subcarriers, wherein the closed subcarrier set comprises a subcarrier set required to be closed on the multiple lines;

send the closed subcarrier set of the multiple lines obtained by the obtaining module to a transceiver;

calculate, according to the line crosstalk channel information corresponding to each subcarrier, a line set required to be closed and corresponding to each subcarrier; and search, according to the line set that is corresponding to each subcarrier and that is calculated by the calculation unit, for a subcarrier required to be closed on each line in the line set, to obtain the subcarrier set, required to be closed, of the multiple lines;

estimate a power gain factor according to the line crosstalk channel information corresponding to each subcarrier, and add a line that makes the estimated power gain factor greater than a threshold to the line set required to be closed and corresponding to each subcarrier;

calculate, according to a channel matrix corresponding to any subcarrier, a cancellation matrix $P^k$ of the any subcarrier, and use each element in $P^k$ as an estimated power gain factor;

determine whether each element in $P^k$ of the any subcarrier is greater than a first preset threshold; and when an element $P^k_{ij}$ in $P^k$ of the any subcarrier is greater than the first preset threshold, add a line with a lower priority of a line i and a line j to a line set required to be closed and corresponding to the any subcarrier, wherein $P^k_{ij}$ denotes a cancellation coefficient of crosstalk of the line j to the line i; and wherein the line crosstalk channel information corresponding to each subcarrier comprises a channel matrix corresponding to each subcarrier.

8. The device according to claim 7, wherein the memory further comprises instructions that, when executed by the processor, cause the device to:

if the line i is added to the line set required to be closed and corresponding to the any subcarrier, remove the ith row and the ith column of the channel matrix corresponding to the any subcarrier, and repetitively perform the following steps on remaining submatrices:

determining whether each element in $P^k$ of the any subcarrier is greater than a first preset threshold; and if an element $P^k_{ij}$ in $P^k$ of the any subcarrier is greater than the first preset threshold, adding a line with a lower priority of a line i and a line j to a line set required to be closed and corresponding to the any subcarrier, until all elements in $P^k$ of the any subcarrier are less than the first preset threshold; or if the line j is added to the line set required to be closed and corresponding to the any subcarrier, remove the jth row and the jth column of the channel matrix corresponding to the any subcarrier, and repetitively perform the following steps on remaining submatrices: determining whether each element in $P^k$ of the any subcarrier is greater than a first preset threshold; and if an element $P^k_{ij}$ in $P^k$ of the any subcarrier is greater than the first preset threshold, adding a line with a lower priority of a line i and a line j to a line set required to be closed and corresponding to the any subcarrier, until all elements in $P^k$ of the any subcarrier are less than the first preset threshold.

9. The device according to claim 7, wherein the memory further comprises instructions that, when executed by the processor, cause the device to:

allocate power on the subcarrier required to be closed on each line to an unclosed subcarrier on each line.

10. A power control device for use in a vectoring system, wherein the vectoring system comprises multiple lines, each line comprises multiple subcarriers, and for each subcarrier, a crosstalk channel is formed between the multiple lines, the power control device comprising:

a processor; and a memory coupled to the processor, the memory comprising instructions that, when executed by the processor, cause the device to:

obtain a closed subcarrier set of the multiple lines according to line crosstalk channel information corresponding to each subcarrier of the multiple subcarriers, wherein the closed subcarrier set comprises a subcarrier set required to be closed on the multiple lines;

send the closed subcarrier set of the multiple lines obtained by the obtaining module to a transceiver;

calculate, according to the line crosstalk channel information corresponding to each subcarrier, a line set required to be closed and corresponding to each subcarrier; and search, according to the line set that is corresponding to each subcarrier and that is calculated by the calculation unit, for a subcarrier required to be closed on each line in the line set, to obtain the subcarrier set, required to be closed, of the multiple lines;

estimate a power gain factor according to the line crosstalk channel information corresponding to each subcarrier, and add a line that makes the estimated power gain factor greater than a threshold to the line set required to be closed and corresponding to each subcarrier;

select an index submatrix corresponding to a channel matrix corresponding to any subcarrier, and calculate a power gain factor PI (i, j) of the index submatrix;

determine whether the power gain factor PI (i, j) of the index submatrix is less than a second preset threshold; and if the power gain factor PI (i, j) of the index submatrix is greater than the second preset threshold, add a line with a lower priority of a line i and a line j to a line set required to be closed and corresponding to the any subcarrier; and wherein the line crosstalk channel information corresponding to each subcarrier comprises a channel matrix corresponding to each subcarrier.

11. The device according to claim 10, wherein the memory further comprises instructions that, when executed by the processor, cause the device to:

if the line i is added to the line set required to be closed and corresponding to the any subcarrier, remove the ith row and the ith column of the channel matrix corresponding to the any subcarrier, select another index submatrix corresponding to the channel matrix corresponding to the any subcarrier, and perform the following steps: selecting an index submatrix corresponding to a channel matrix corresponding to any subcarrier and calculating a power gain factor PI (i, j) of the index submatrix; determining whether the power gain factor PI (i, j) of the index submatrix is greater than a second preset threshold; and if the power gain factor PI (i, j) of the index submatrix is greater than the second preset threshold, adding a line with a lower priority of a line i and a line j to a line set required to be closed and corresponding to the any subcarrier, until all lines are traversed; or if the line j is added to the line set required to be closed and corresponding to the any subcarrier, remove the jth row and the jth column of the channel matrix corresponding to the any subcarrier, select another index submatrix corresponding to the channel matrix corresponding to the any subcarrier, and perform the following steps: selecting an index submatrix corresponding to a channel matrix corresponding to any subcarrier and calculating a power gain factor PI (i, j) of the index submatrix; determining whether the power gain factor PI (i, j) of the index submatrix is greater than a second preset threshold; and if the power gain factor PI (i, j) of the index submatrix is greater than the second preset threshold, adding a line with a lower priority of a line i and a line j to a line set required to be closed and corresponding to the any subcarrier, until all lines are traversed.

12. A power control device for use in a vectoring system, wherein the vectoring system comprises multiple lines, each line comprises multiple subcarriers, and for each subcarrier, a crosstalk channel is formed between the multiple lines, the power control device comprising:
a processor; and
a memory coupled to the processor, the memory comprising instructions that, when executed by the processor, cause the device to:
  obtain a closed subcarrier set of the multiple lines according to line crosstalk channel information corresponding to each subcarrier of the multiple subcarriers, wherein the closed subcarrier set comprises a subcarrier set required to be closed on the multiple lines;
  send the closed subcarrier set of the multiple lines obtained by the obtaining module to a transceiver;
  calculate, according to the line crosstalk channel information corresponding to each subcarrier, a line set required to be closed and corresponding to each subcarrier; and
  search, according to the line set that is corresponding to each subcarrier and that is calculated by the calculation unit, for a subcarrier required to be closed on each line in the line set, to obtain the subcarrier set, required to be closed, of the multiple lines;
  estimate a power gain factor according to the line crosstalk channel information corresponding to each subcarrier, and add a line that makes the estimated power gain factor greater than a threshold to the line set required to be closed and corresponding to each subcarrier;
  decompose a channel matrix corresponding to any subcarrier to obtain a unitary matrix and a triangular matrix, and calculate a value of a minimum element of a modulus value of a diagonal of the triangular matrix, and/or calculate a ratio of the value of the minimum element of the modulus value of the diagonal of the triangular matrix to a length of a vector formed by the kth column in a channel matrix corresponding to the element, wherein a reciprocal of the value of the minimum element of the modulus value of the diagonal of the triangular matrix, and/or a reciprocal of the ratio of the value of the minimum element of the modulus value of the diagonal of the triangular matrix to the length of the vector formed by the kth column in the channel matrix corresponding to the element is a power gain factor;
  determine whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and
  if the value of the minimum element of the modulus value is less than the third preset threshold, and/or the ratio of the value of the minimum element of the modulus value to the length of the vector formed by the kth column in the channel matrix corresponding to the element is less than the fourth preset threshold, add a line j corresponding to the minimum element to a line set required to be closed and corresponding to the any subcarrier;
wherein the line crosstalk channel information corresponding to each subcarrier comprises a channel matrix corresponding to each subcarrier.

13. The device according to claim 12, wherein the memory further comprises instructions that, when executed by the processor, cause the device to:
remove the jth row and the jth column of the channel matrix corresponding to the any subcarrier, and repetitively perform the following on remaining submatrices:
  decompose a channel matrix corresponding to any subcarrier to obtain a unitary matrix and a triangular matrix, and calculating a value of a minimum element of a modulus value of a diagonal of the triangular matrix, and/or calculate a ratio of the value of the minimum element of the modulus value of the diagonal of the triangular matrix to a length of a vector Ruined by the kth column in a channel matrix corresponding to the element;
  determine whether the value of the minimum element of the modulus value is less than a third preset threshold, and/or whether the ratio of the value of the minimum element of the modulus value to the length of the vector formed by the kth column in the channel matrix corresponding to the element is less than a fourth preset threshold; and
  if the value of the minimum element of the modulus value is less than the third preset threshold, and/or the ratio of the value of the minimum element of the modulus value to the length of the vector formed by the kth column in the channel matrix corresponding to the element is less than the fourth preset threshold, add a line j corresponding to the minimum element to a line set required to be closed and corresponding to the any subcarrier, until the value of the minimum element of the modulus value is less than the third preset threshold, and/or the ratio of the value of the minimum element of the modulus value to the length of the vector formed by the kth column in the channel matrix corresponding to the element is less than the fourth preset threshold.

* * * * *